(12) United States Patent
Walia et al.

(10) Patent No.: US 12,282,801 B2
(45) Date of Patent: Apr. 22, 2025

(54) INSTRUCTION INTERPRETATION FOR WEB TASK AUTOMATION

(71) Applicant: YAAR INC., Toronto (CA)

(72) Inventors: Karan Walia, Brampton (CA); Anton Mamonov, Toronto (CA); Sobi Walia, Brampton (CA)

(73) Assignees: Karan Walia; Anton Mamonov; Sobi Walia

( * ) Notice: Subject to any disclaimer, the term of this patent is extended or adjusted under 35 U.S.C. 154(b) by 391 days.

(21) Appl. No.: 17/395,164

(22) Filed: Aug. 5, 2021

(65) Prior Publication Data

US 2023/0045426 A1 Feb. 9, 2023

(51) Int. Cl.
*G06F 9/48* (2006.01)
*G06F 40/14* (2020.01)
*G06F 40/279* (2020.01)
*G06F 40/30* (2020.01)
*G06F 40/40* (2020.01)

(52) U.S. Cl.
CPC ............ *G06F 9/4881* (2013.01); *G06F 40/14* (2020.01); *G06F 40/279* (2020.01); *G06F 40/30* (2020.01); *G06F 40/40* (2020.01)

(58) Field of Classification Search
None
See application file for complete search history.

(56) References Cited

U.S. PATENT DOCUMENTS

| 5,809,250 | A | 9/1998 | Kisor |
| 6,418,471 | B1 | 7/2002 | Shelton et al. |
| 7,200,804 | B1 | 4/2007 | Khavari et al. |
| 7,269,633 | B2 | 9/2007 | Allan |
| 7,536,389 | B1 | 5/2009 | Prabhakar et al. |
| 8,145,705 | B1 | 3/2012 | Rust |
| 8,196,118 | B2 | 6/2012 | Vainer et al. |
| 8,352,547 | B1 | 1/2013 | Rust |
| 8,392,890 | B2 | 3/2013 | Miller |

(Continued)

FOREIGN PATENT DOCUMENTS

| WO | WO2019103738 A1 | 5/2019 |
| WO | 2022199806 | 9/2022 |

OTHER PUBLICATIONS

Final Office Action dated Apr. 4, 2022 issued by the USPTO in U.S. Appl. No. 17/244,457.

(Continued)

*Primary Examiner* — Adam Lee

(57) ABSTRACT

A method of generating an instruction performance skeleton employs an instruction unit configured to receive a natural language instruction. From the natural language instruction, a sequence of clauses may be extracted. The instruction unit then determines a target website or websites on which to perform the task. The object models of the target website are generated. A comparison of the sequence of actions to the object model and its labelling hierarchical class structure is performed. Based on this comparison, an instruction performance skeleton is generated. In future, on the basis of a further natural language instruction that is similar to the previous natural language instruction, the instruction performance skeleton may be modified to generate a playback performance skeleton to arrange performance of a task.

20 Claims, 17 Drawing Sheets

(56) References Cited

U.S. PATENT DOCUMENTS

| | | | |
|---|---|---|---|
| 8,433,733 B2 | 4/2013 | Sayed et al. | |
| 8,495,585 B2 | 7/2013 | Miller | |
| 8,577,963 B2 | 11/2013 | Trahan et al. | |
| 8,639,680 B1* | 1/2014 | Ciccolo | G06F 16/951 |
| | | | 707/723 |
| 8,683,447 B2 | 3/2014 | Miller | |
| 8,706,860 B2 | 4/2014 | Trahan et al. | |
| 8,799,412 B2 | 8/2014 | Trahan et al. | |
| 8,954,416 B2 | 2/2015 | Tuttle | |
| 8,984,491 B2 | 3/2015 | Miller | |
| 9,195,768 B2 | 11/2015 | Jenkins et al. | |
| 9,363,134 B1 | 6/2016 | Goodspeed | |
| 9,418,172 B2 | 8/2016 | White et al. | |
| 9,531,825 B1 | 12/2016 | Brooks et al. | |
| 9,594,845 B2 | 3/2017 | Bengualid et al. | |
| 9,621,406 B2 | 4/2017 | Trahan et al. | |
| 9,740,791 B1 | 8/2017 | Killian | |
| 9,747,262 B1* | 8/2017 | Liu | G06F 40/154 |
| 9,753,843 B2 | 9/2017 | Kandpal | |
| 9,880,994 B1 | 1/2018 | Choi | |
| 9,940,396 B1* | 4/2018 | Willhoit | G06F 16/9535 |
| 10,050,849 B1* | 8/2018 | Long | H04L 43/04 |
| 10,083,159 B1 | 9/2018 | Bekmambetov et al. | |
| 10,362,090 B2 | 7/2019 | Mahamuni et al. | |
| 10,366,140 B2 | 7/2019 | Butt et al. | |
| 10,382,386 B2 | 8/2019 | Gissing et al. | |
| 10,394,925 B2 | 8/2019 | Bengualid et al. | |
| 10,482,083 B2 | 11/2019 | Duke | |
| 10,489,286 B2 | 11/2019 | Miller | |
| 10,628,630 B1* | 4/2020 | Surace | H04L 67/02 |
| 10,686,738 B2 | 6/2020 | Daniel et al. | |
| 10,719,573 B2 | 7/2020 | Dube-Cousineau | |
| 10,884,907 B1 | 1/2021 | Zhao et al. | |
| 10,949,748 B2 | 3/2021 | Williams et al. | |
| 11,016,967 B2 | 5/2021 | Duke | |
| 11,263,118 B2 | 3/2022 | Bhadani | |
| 11,507,497 B2 | 11/2022 | Zhao et al. | |
| 11,636,252 B1* | 4/2023 | Myers | G06F 40/143 |
| | | | 715/234 |
| 11,803,415 B2 | 10/2023 | Dunn | |
| 2003/0005044 A1 | 1/2003 | Miller et al. | |
| 2003/0216913 A1* | 11/2003 | Keely | G06V 30/1423 |
| | | | 704/235 |
| 2004/0100507 A1 | 5/2004 | Hayner et al. | |
| 2004/0111488 A1 | 6/2004 | Allan | |
| 2008/0077671 A1 | 3/2008 | Rust | |
| 2008/0228494 A1* | 9/2008 | Cross | G10L 15/22 |
| | | | 707/E17.119 |
| 2008/0235564 A1* | 9/2008 | Erol | G06F 16/9577 |
| | | | 715/202 |
| 2009/0019354 A1 | 1/2009 | Jaiswal et al. | |
| 2009/0100345 A1 | 4/2009 | Miller | |
| 2010/0095208 A1 | 4/2010 | White et al. | |
| 2011/0191676 A1 | 8/2011 | Guttman et al. | |
| 2011/0258532 A1* | 10/2011 | Ceze | G06F 16/9574 |
| | | | 715/234 |
| 2012/0045132 A1* | 2/2012 | Wong | G06V 10/464 |
| | | | 382/195 |
| 2012/0079395 A1 | 3/2012 | Bengualid et al. | |
| 2012/0117455 A1 | 5/2012 | Fogel et al. | |
| 2012/0166933 A1* | 6/2012 | Cui | G06F 40/226 |
| | | | 715/234 |
| 2012/0331375 A1* | 12/2012 | Fanning | G06F 16/986 |
| | | | 715/234 |
| 2013/0007100 A1 | 1/2013 | Trahan et al. | |
| 2013/0007101 A1 | 1/2013 | Trahan et al. | |
| 2013/0007102 A1 | 1/2013 | Trahan et al. | |
| 2013/0007241 A1 | 1/2013 | Trahan et al. | |
| 2013/0054675 A1 | 2/2013 | Jenkins et al. | |
| 2013/0151600 A1 | 6/2013 | Miller | |
| 2013/0151949 A1 | 6/2013 | Miller | |
| 2013/0159317 A1 | 6/2013 | Huang et al. | |
| 2013/0219368 A1 | 8/2013 | Carteri et al. | |
| 2013/0227397 A1* | 8/2013 | Tvorun | G06F 40/154 |
| | | | 715/234 |
| 2013/0254139 A1 | 9/2013 | Lei | |
| 2013/0290858 A1 | 10/2013 | Beveridge | |
| 2013/0332398 A1 | 12/2013 | Wu | |
| 2013/0332484 A1 | 12/2013 | Gajic | |
| 2013/0332815 A1* | 12/2013 | Gallo | G09B 21/003 |
| | | | 715/234 |
| 2014/0013165 A1 | 1/2014 | Miller | |
| 2014/0136013 A1* | 5/2014 | Wolverton | B60K 35/00 |
| | | | 701/1 |
| 2014/0281918 A1* | 9/2014 | Wei | H04L 67/56 |
| | | | 715/234 |
| 2014/0373030 A1 | 12/2014 | Francis | |
| 2015/0186249 A1 | 7/2015 | Miller | |
| 2015/0254219 A1* | 9/2015 | Harel | G06F 16/972 |
| | | | 715/234 |
| 2015/0324377 A1 | 11/2015 | Hayden | |
| 2016/0147645 A1 | 5/2016 | Kandpal | |
| 2016/0188548 A1 | 6/2016 | Ciabarra et al. | |
| 2016/0212073 A1 | 7/2016 | Kulkarni et al. | |
| 2016/0219048 A1 | 7/2016 | Porras et al. | |
| 2016/0224458 A1* | 8/2016 | Spiridonov | G06F 40/14 |
| 2016/0259508 A1 | 9/2016 | Eccleston | |
| 2017/0104841 A1 | 4/2017 | Duke | |
| 2017/0116179 A1 | 4/2017 | Gagné-Langevin | |
| 2017/0124213 A1 | 5/2017 | Bengualid et al. | |
| 2017/0220459 A1* | 8/2017 | Kulkarni | H04L 67/02 |
| 2017/0220531 A1* | 8/2017 | Hamer | G06F 40/143 |
| 2017/0337177 A1* | 11/2017 | Maxwell, III | G06F 40/205 |
| 2018/0046471 A1 | 2/2018 | Peretz et al. | |
| 2018/0123934 A1 | 5/2018 | Gissing et al. | |
| 2018/0173375 A1 | 6/2018 | Webber | |
| 2018/0192108 A1* | 7/2018 | Lyons | G06F 16/219 |
| 2018/0203674 A1* | 7/2018 | Dayanandan | G06F 8/35 |
| 2018/0314505 A1* | 11/2018 | Wang | G06F 8/433 |
| 2018/0314513 A1* | 11/2018 | DiTullio | G06F 16/9566 |
| 2019/0020673 A1 | 1/2019 | Weinstein | |
| 2019/0228766 A1 | 7/2019 | White et al. | |
| 2019/0317977 A1 | 10/2019 | Butt | |
| 2020/0042516 A1 | 2/2020 | Duke | |
| 2020/0110781 A1 | 4/2020 | Staszak | |
| 2020/0133829 A1 | 4/2020 | Zazo et al. | |
| 2020/0134098 A1 | 4/2020 | Dube-Cousineau | |
| 2020/0143805 A1 | 5/2020 | Roy | |
| 2020/0175430 A1 | 6/2020 | Kochura et al. | |
| 2020/0226126 A1 | 7/2020 | Zou | |
| 2020/0364953 A1 | 11/2020 | Simoudis | |
| 2020/0379889 A1 | 12/2020 | Hamid | |
| 2021/0004436 A1 | 1/2021 | Jauhar et al. | |
| 2021/0064821 A1* | 3/2021 | Seth | G06F 40/289 |
| 2021/0082424 A1 | 3/2021 | Johnson | |
| 2021/0109769 A1* | 4/2021 | Yang | G06F 40/30 |
| 2021/0119955 A1 | 4/2021 | Penov et al. | |
| 2021/0124675 A1 | 4/2021 | Zhao et al. | |
| 2021/0216442 A1 | 7/2021 | Bhadani | |
| 2021/0232121 A1* | 7/2021 | Pramanick | G06F 40/30 |
| 2021/0271671 A1 | 9/2021 | Duke | |
| 2021/0303342 A1 | 9/2021 | Dunn | |
| 2022/0198390 A1* | 6/2022 | DeLuca | G06F 40/20 |
| 2022/0309150 A1* | 9/2022 | Tsirkin | G06F 21/53 |
| 2022/0342646 A1* | 10/2022 | Ayyalasomayajula | G06F 8/36 |
| 2023/0018387 A1 | 1/2023 | Kuksta | |

OTHER PUBLICATIONS

Lau, Tessa et al. "A Conversational Interface to Web Automation", Oct. 3, 2010, ACM. (Year: 2010).

Barman, Shaon et al. Ringer: Web Automation by Demonstration, Nov. 2, 2016, ACM. (Year: 2016).

"Standard ECMA-404: The JSON Data Interchange Syntax", Dec. 2017, Ecma International. (Year 2017).

Non-final Office Action dated Sep. 10, 2021 in U.S. Appl. No. 17/244,457.

Non-Final Office Action mailed by the USPTO on Aug. 25, 2023, in the related U.S. Appl. No. 17/395,229.

Toby Jia-Jun Li, et al., "Interactive Task Learning from GUI-Grounded Natural Language Instructions and Demonstrations",

(56) References Cited

OTHER PUBLICATIONS

Proceedings of the 58th Annual Meeting of the Association for Computational Linguistics: System Demonstrations, Jul. 5-Jul. 10, 2020, pp. 215 to 223.

Pradip Pramanick, et al., "DeComplex: Task Planning from complex natural instructions by a collocating robot", 2020 IEEE/RSJ International Conference on Intelligent Robots and Systems (IROS), Oct. 25-29, 2020, pp. 6894 to 6901, Las Vegas, NV, USA (Virtual).

Final Office Action mailed by the USPTO on Jul. 10, 2023, in the related U.S. Appl. No. 17/244,457.

Non-Final Office Action mailed by the USPTO on May 4, 2023, in the related U.S. Appl. No. 17/244,558.

Non-Final Office Action mailed by the USPTO on Sep. 19, 2022, in the related U.S. Appl. No. 17/244,457.

Office Action issued in U.S. Appl. No. 17/244,457 by the USPTO on Jan. 17, 2024.

Notice of Allowance dated Oct. 11, 2024 issued by USPTO in U.S. Appl. No. 17/244,558.

Eric, Mihail, et al., "Key-value retrieval networks for task-oriented dialogue.", arXiv preprint arXiv: 1705.05414, 2017.

Final Office action dated Mar. 8, 2024 issued by USPTO in U.S. Appl. No. 17/395,229.

Final Office action dated Jul. 24, 2024 issued by USPTO in U.S. Appl. No. 17/244,457.

Notice of Allowance dated Sep. 11, 2024 issued by USPTO in U.S. Appl. No. 17/395,229.

Tuysuz, Avenoglu, and Eren, "A workflow-based mobile guidance framework for managing personal activities", Seventh International Conference on Next Generation Mobile Apps, Services and Technologies, Sep. 2013, pp. 13-18, IEEE.

Notice of Allowance dated Dec. 18, 2024 issued by USPTO in U.S. Appl. No. 17/244,558.

* cited by examiner

800

"Search for Starbucks in Google Maps and click on directions, then select the starting point input as my current location, click on driving icon and extract the driving distance and time, and then click on walking and proceed to find the distance and time for the same".

FIG. 8

| STEP | CLAUSE |
|---|---|
| 1 | Search for Starbucks in Google Maps |
| 2 | click on directions, |
| 3 | select the starting point input as my current location, |
| 4 | click on driving icon |
| 5 | extract the driving distance |
| 6 | extract driving time, |
| 7 | click on walking icon |
| 8 | extract walking distance |
| 9 | extract walking time |

| STEP | KEY | VALUE | OBJECT MODEL LOCATION | ACTION |
|---|---|---|---|---|
| 1 | URL | GOOGLEMAPS | URL_LOAD(); | NULL |
| 2 | | | Body_Table_Div_DIRECTIONS | LeftClick |
| 3 | | | Body_Table_Div_TEXTFIELD1 | LeftClick |
| 4 | START_LOCATION | USER_LOCATION | Body_Table_Div_TEXTFIELD1 | TextEntry |
| 3 | | | Body_Table_Div_TEXTFIELD2 | LeftClick |
| 4 | END_LOCATION | STARBUCKS | Body_Table_Div_TEXTFIELD2 | TextEntry |
| 5 | | | Body_Table_Div_SEARCH | LeftClick |
| 6 | PARAM_1 | DRIVING | Body_Table_Div_DRIVING | LeftClick |
| 7 | | | Body_Table_Div_FIELD_1 | STORE |
| 8 | PARAM_2 | WALKING | Body_Table_Div_WALKING | LeftClick |
| 9 | | | Body_Table_Div_FIELD_2 | STORE |
| 10 | RETURN_1 | RESULT_LOCATION | Body_Table_Div_FIELD_A | NULL |
| 11 | RETURN_2 | DRIVING_TIME | Body_Table_Div_FIELD_B | NULL |
| 12 | RETURN_3 | DRIVING_DISTANCE | Body_Table_Div_FIELD_C | NULL |
| 13 | RETURN_4 | WALKING_TIME | Body_Table_Div_FIELD_D | NULL |
| 14 | RETURN_5 | WALKING_DISTANCE | Body_Table_Div_FIELD_E | NULL |

FIG. 11

| STEP | KEY | VALUE | OBJECT MODEL LOCATION | ACTION |
|---|---|---|---|---|
| 1 | URL | GOOGLEMAPS | URL_LOAD(); | NULL |
| 2 | | | Body_Table_Div_DIRECTIONS | LeftClick |
| 3 | | | Body_Table_Div_TEXTFIELD | LeftClick |
| 4 | END LOCATION | MCDONALDS | Body_Table_Div_TEXTFIELD | TextEntry |
| 5 | | | Body_Table_Div_SEARCH | LeftClick |
| 6 | PARAM_1 | BIKING | Body_Table_Div_BIKING | LeftClick |
| 7 | | | Body_Table_Div_FIELD_1 | STORE |
| 8 | PARAM_2 | TRANSIT | Body_Table_Div_TRANSIT | LeftClick |
| 9 | | | Body_Table_Div_FIELD_2 | STORE |
| 10 | RETURN_1 | RESULT_LOCATION | Body_Table_Div_FIELD_A | NULL |
| 11 | RETURN_2 | BIKING_TIME | Body_Table_Div_FIELD_B | NULL |
| 12 | RETURN_3 | BIKING_DISTANCE | Body_Table_Div_FIELD_C | NULL |
| 13 | RETURN_4 | TRANSIT_TIME | Body_Table_Div_FIELD_D | NULL |
| 14 | RETURN_5 | TRANSIT_DISTANCE | Body_Table_Div_FIELD_E | NULL |

FIG. 15

INSTRUCTION INTERPRETATION FOR WEB TASK AUTOMATION

CROSS-REFERENCE TO RELATED APPLICATIONS

This disclosure is related to U.S. patent application Ser. Nos. 17/244,457 and 17/244,558, both filed on Apr. 29, 2021. The entirety of both applications is incorporated by reference.

FIELD

This disclosure relates to automating performance of a web task on a web page and, more particularly, interpreting an instruction to perform the web task.

BACKGROUND

Web task automation refers to a process of using automation tools to execute tasks performed through an internet browser. Some forms of web automation may be performed using a variety of web browser software running on a personal computer (such as a desktop or a laptop), a tablet, or a smart phone. Examples of web tasks may include sending an email, scheduling a calendar event, implementing a search using a search engine, searching through an inbox, scheduling a reminder, etc. Further examples include interfacing with other web applications, such as Uber™ to book a ride, make an appointment, or scheduling calendar events with multiple people for specific times.

A conventional web browser is a software component that, when executed by a processor, can cause the processor to retrieve files from a remote server generate a display of a web page to a user, to thereby, allow for interaction between the user and the files. These files may contain code that may be interpreted and executed, or otherwise executed—such as Hypertext Markup Language (HTML) code, Cascading Style Sheets (CSS) code, JavaScript™ code, WebAssembly (Wasm), and more. A web browser may cause the processor to implement an instance of a web engine to determine specific content to be rendered on a user interface (such as a screen) based on the files retrieved. The content may be displayed as a webview—an instance of the browser engine presented in a frame that may be native to the browser or be part of some other application. In generating the display of the web page, the browser may generate, based on the file or files retrieved from the remote server, an object model, such as a Document Object Model (DOM). An object model may contain a hierarchical tree-like structure that establishes parent-child relationships between the various elements of the web page that are to be rendered on the user interface. A browser may have additional functions and may perform other tasks within a computing system.

Many interactions between a human and a computing device involve an action completed using a Graphic User Interface (GUI). Often, such action can include using a using a mouse or similar component of the electronic device to implement navigation actions and item selection actions within the interface, and using a keyboard component of the electronic device to implement text entry actions and number entry actions. To accomplish a single task on a web page loaded using a personal computer, a user typically carries out a series of actions. On a conventional personal computer these actions may take the form of mouse actions and keyboard actions. Similarly, on a smart phone or tablet device, a user may employ a touchscreen, a voice interface or the like to accomplish both clicking and typing actions.

SUMMARY

For a web task to be autonomously performed on a web page, an instruction performance skeleton is generated. The instruction performance skeleton informs a browser how to carry out the web task. One way to generate the instruction performance skeleton is by receiving a natural language instruction and deriving, on the basis of the natural language instruction, how to perform the task. The natural language instruction may indicate a web page upon which a task is to be performed. An object model of the web page may be compared to the content of the natural language instruction to generate an instruction performance template, indicative of an order of actions to be performed on specific web elements.

A playback engine may then employ the instruction performance skeleton, in conjunction with a received natural language input, to generate a playback performance skeleton for the performance of the same or a similar task.

In one aspect, there is provided a method of generating a playback performance skeleton for directing performance of a task, the method comprising: receiving a natural language instruction, the natural language instruction describing a sequence, wherein the sequence is representative of a manner in which a human would interact with a computer interface to perform a task on at least one web page; comparing the sequence to at least one object model of the at least one web page; and generating, based on the comparing, an instruction performance skeleton, the instruction performance skeleton representative of a model for performance of the task, wherein the performance of the task includes carrying out actions on elements of the at least one web page.

In another aspect, there is an automated computer-implemented method of directing performance of a task, the method comprising: receiving a natural language input indicative of the task; generating a playback performance skeleton for the task, based on the natural language input and an instruction performance skeleton stored in a memory on a server; determining, based on the playback performance skeleton, a first action for the task, wherein the first action is to be carried out on a web page rendered by a webview or headless browser, the rendering including generating an object model of the web page; sending a first action message, the first action message containing instructions for the webview or headless browser to perform the first action; receiving an update message, the update message related to the first action and including information about the object model of the first web page; responsive to the receiving the update message, determining a second action for the task; and sending a second action message, the second action message containing instructions for the webview or headless browser to perform the second action.

BRIEF DESCRIPTION OF DRAWINGS

Embodiments will be described, by way of example only, with reference to the accompanying figures in which:

FIG. 8 illustrates a natural language instruction, according to one embodiment;

FIG. 9 illustrates an example database of sequences of clauses, according to one embodiment;

FIG. 11 illustrates an example instruction performance template, according to one embodiment;

FIG. 15 illustrates an example playback performance skeleton, according to one embodiment;

DETAILED DESCRIPTION

For illustrative purposes only, specific example embodiments will now be detailed below in conjunction with the figures.

Figure 1:
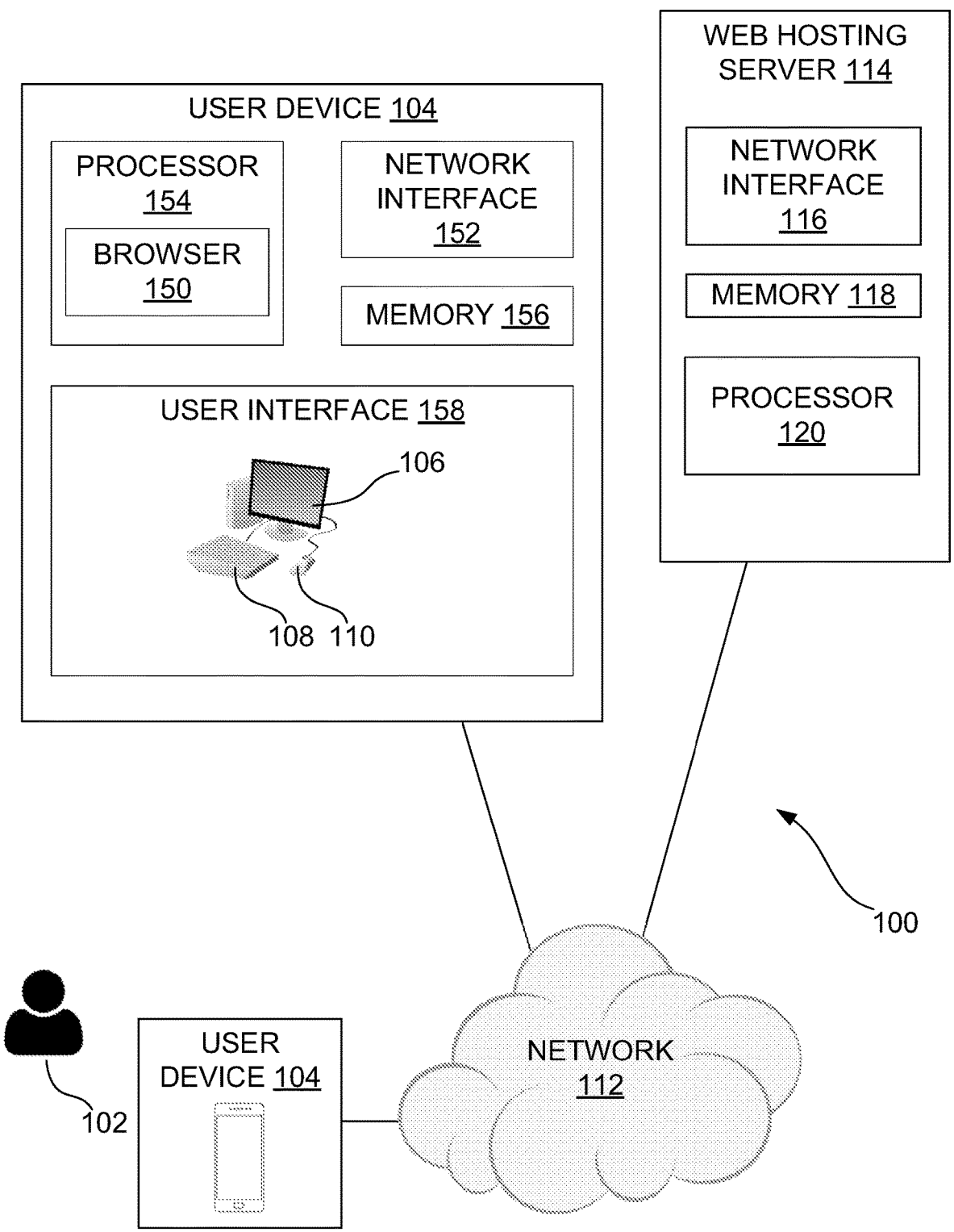
FIG. 1 illustrates a system including an electronic device in communication with a web hosting server via a network.

FIG. 1 illustrates an environment 100 in which a user 102 may interact with an electronic computing device (a user device) 104 to load a web page available from a web hosting server 114. The actions of selecting a web page, retrieving web page data associated with the web page, rendering that data, and displaying the web page to the user is known and is often referred to as "web browsing." User device 104 can send a request over a network 112 to retrieve, from web hosting server 114, a web page. User device 104 may include a screen 106 (which may be a touch screen), a keyboard 108 and a mouse 110. User device 104 is illustrated as including a browser 150 implemented by a user device processor 154, a user device network interface 152, a user device memory 156, and a user interface 158. Web hosting server 114 is illustrated as including a web hosting server network interface 116, a web hosting server processor 120, and a web hosting server memory 118. User device processor 154 and web hosting server processor 120 may be implemented as one or more processors configured to execute instructions stored in a memory (e.g., in user device memory 156 or web hosting server memory 118, as appropriate). Alternatively, some or all of user device processor 154 and web hosting server processor 120 may be implemented using dedicated circuitry, such as a central processing unit (CPU), a programmed field-programmable gate array (FPGA), a graphical processing unit (GPU), or an application-specific integrated circuit (ASIC). Web hosting server processor 120 may directly perform or may instruct components of web hosting server 114 to perform the functions of web hosting server 114 explained herein.

According to one embodiment, network 112 may be a packet-switched data network, including a cellular network, a Wi-Fi network or other wireless or wired local area network (LAN), a WiMAX network or other wireless or wired wide area network (WAN), etc. Web hosting server 114 may also communicate with other servers (not shown) in network 112. Example protocols that may be used in network 112 include the known transmission control protocol (TCP) and Internet protocol (IP).

In operation, a web request sent from user device 104 indicates a web page in the form of a server resource (e.g., a location or function/operation), within web hosting server 114, to which user device 104 is requesting access. For example, a web request may be a request to receive a home web page of an online store, to receive a web page associated with a web app (such as an email web page or a calendar web page), etc. A web request from user device 104 is sent over network 112 to web hosting server 114, and is received by web hosting server network interface 116 and processed by web hosting server processor 120 having access to web hosting server memory 118. Responsive to the request, web hosting server 114 will send back to user device 104, via network interface 116 and over network 112, data for allowing user device 104 to render the web page.

Figure 2:
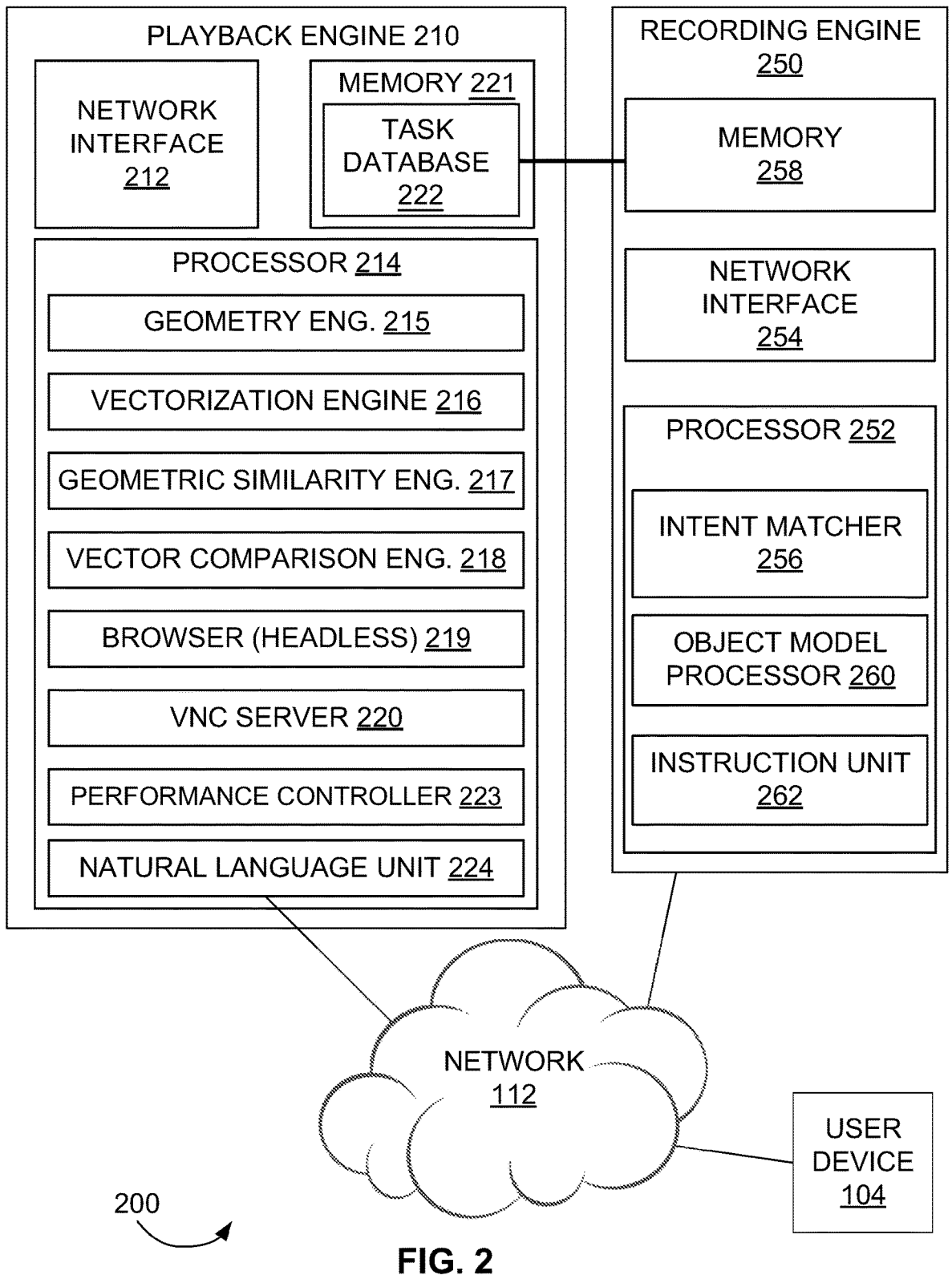
FIG. 2 illustrates a system including the electronic device of FIG. 1, a recording engine and a playback engine, according to one embodiment.

FIG. 2 illustrates an environment 200 for carrying out a task. Environment 200 includes user device 104, that can communicate over network 112 with a playback engine 210 and a recording engine 250. Playback engine 210 includes a playback engine network interface 212, a playback engine memory 221, and a playback engine processor 214. Playback engine processor 214 is capable of implementing a geometry engine 215, vectorization engine 216, geometric similarity engine 217, a vector comparison engine 218, a headless browser 219, a VNC server 220, a performance controller 223, and a natural language unit (NLU) 224. Playback engine memory 221 of playback engine 210 includes a task database 222 that stores instruction performance skeletons (see FIG. 11 for an example instruction performance skeleton 1100). Recording engine 250 includes a recording engine processor 252, a recording engine network interface 254, and a recording engine memory 258. The recording engine processor 252 is capable of implementing an intent matcher 256, object model processor 260 and an instruction unit 262.

According to some embodiments, any component of playback engine 210 may be accessed by recording engine 250, and vice versa. For example, recording engine 250 may access playback engine memory 221 and task database 222 and recording engine processor 252 may execute a version of headless browser 219.

Each one of browser 150, geometry engine 215, vectorization engine 216, geometric similarity engine 217, vector comparison engine 218, headless browser 219, VNC server 220, performance controller 223, NLU 224, intent matcher 256, object model processor 260 and instruction unit 262 (collectively "functional blocks") may be implemented by one or more processors of user device 104, playback engine 210, and recording engine 250 that execute instructions stored in memory, e.g., in memory 220, 258, or 156. The instructions, when executed by the one or more processors, cause the one or more processors to perform the operations of the respective functional blocks. Alternatively, some or all of the functional blocks may be implemented using dedicated circuitry, such as via an ASIC, a GPU, or an FPGA that performs the operations of the functional blocks, respectively.

In operation, a user (such as user 102) may interact with user interface 158, either to provide a natural language instruction for performing a new task, or to start playback of a pre-defined task. The recording and playback will be described in relation to further figures.

Figure 3:
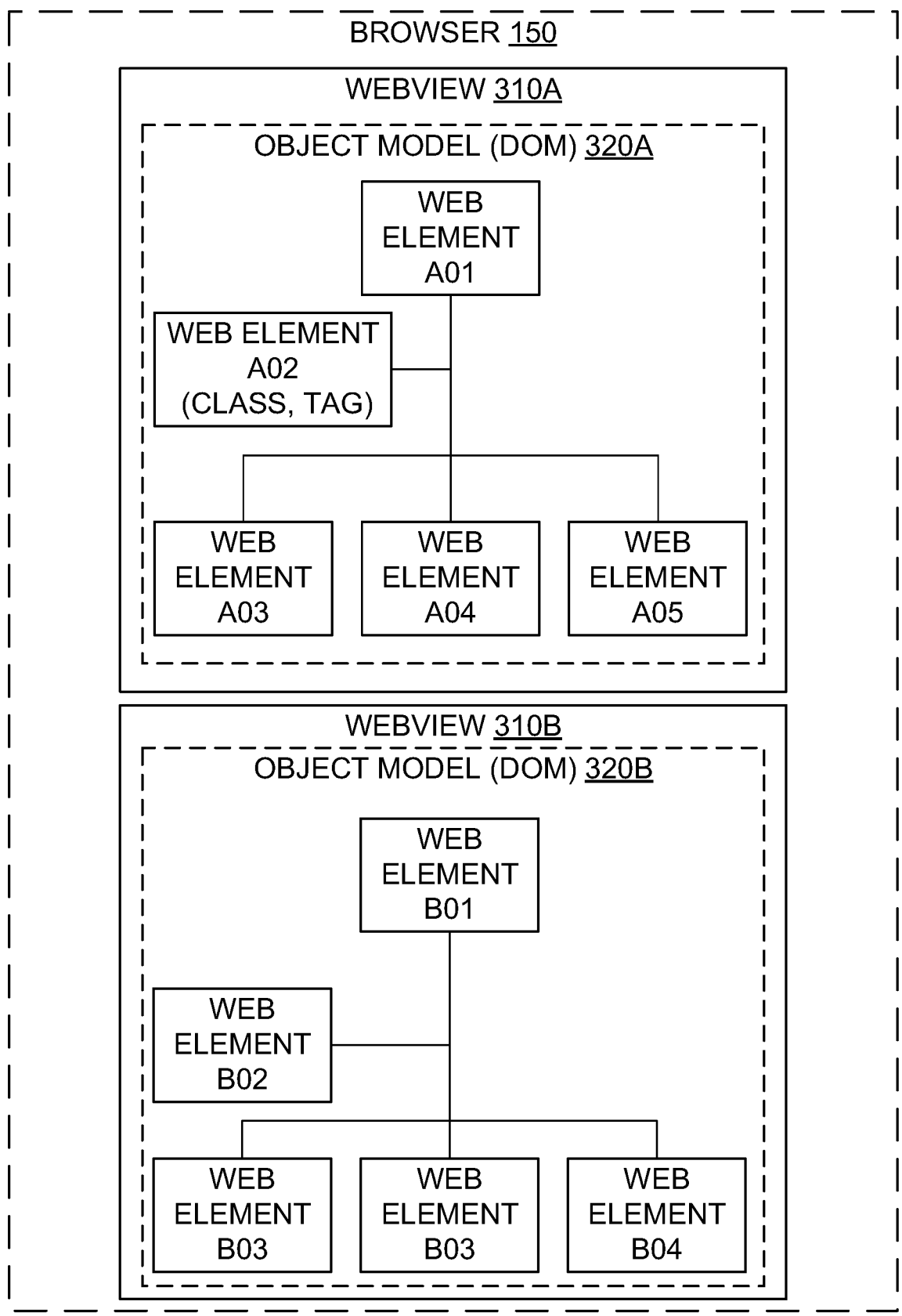
FIG. 3 illustrates a browser managing multiple webviews, according to one embodiment.

As illustrated in FIG. 3, browser 150 is illustrated as managing one or more webviews, such as a first webview 310A and a second webview 310B (individually or collectively 310). According to some embodiments, browser 150 may have any number of webviews 310. Each webview 310 is representative of a single rendering of content of a web page. Browser 150 requests and retrieves a first web page and a second web page from web hosting server 114. First webview 310A generates a rendering of the first web page and a first object model 320A for the first web page. Second webview 310B generates a rendering of the second web page and a second object model 320B for the second web page. The first web page is expected to have a plurality of web elements. The second web page is also expected to have a plurality of web elements. Both first object model 320A and second object model 320B can be in the form of a hierarchical tree structure, as shown in FIG. 3. First webview 310A can identify individual branches of first object model 320A using classes and tags. Similarly, second webview 310B can identify individual branches of second object model 320B using classes and tags.

A web page may instruct a browser to store data related to a browsing session or activity within the browser. This data may be saved in a memory of a user device (such as user device 104). Data stored related to a browsing session is often referred to as a cookie. An example cookie is an authentication cookie. When the user visits a website's login page using a browser, the web server may determine a unique session identifier for the browser session and instruct the browser to store the unique session identifier as an authentication cookie. If the user successfully logs in by providing an appropriate username and password, the server stores in a server-side database the unique session identifier, along with an indication that the particular unique session identifier has been authenticated (i.e., that the session is for an authenticated user). Any request from the browser to load subsequent web pages may include the address for the web page, and include any cookies related to the web page, such as the authentication cookie containing the unique session identifier. The web server hosting the web page will determine if the cookie is related to an authenticated session, and will grant the user access to its services, loading the page.

Another example cookie may be related to user preferences when loading a web page, such how a user last used a web page. If the web page is a calendar, the web page may store a cookie that could include if the calendar web page was last used in a month view (rather than a week view).

Another method of processing web content is using a headless browser. A headless browser may function similar to a browser employing webview as previously described, however may not generate graphic representations of the object models 320. Rather, a headless browser may download the content for the web page, and leave any downloaded information (i.e., the object model 320) in a data-object or text-based format, without generating any graphic representation. A headless browser may still interact with a website using clicking or typing actions, however the actions will be performed using action messages (i.e., computer code indicative of a mouse click, keyboard entry, etc.) directly on the individual branches of the object model 320. Example headless browsers include Selenium and PhantomJS.

Cookies may be extracted from a browser 150 on a user device 104 and sent over a network to a remote web server (such as, for example the remote web server hosting playback engine 210). The remote web server may generate an instance of a headless browser and navigate to a specific web page, using the cookies from the user device 104. Thereby, the headless browser instance of the specific web page may be accessed, loaded and rendered in a similar way to how the web page would be loaded on the user device 104, however without generation of a graphic representation. This allows the headless browser instance to load authenticated instances of a web page.

According to some embodiments, the server hosting the headless browser may include additional software to allow for visual rendering and remote control of the web pages used throughout playback performance. One method of rendering and remote control from a headless browser is use of a Virtual Network Computing (VNC) protocol. A VNC protocol requires use of software instructions stored on both the remote web server and the user device 104 to establish a VNC connection. Accordingly, the remote web server may additionally act as a VNC server, and the user device 104 may act as a VNC client.

A VNC connection will display a visual representation of the web page loaded by the headless browser, and display the visual representation on the user device 104. The user device 104 may send, through the VNC connection, specific keyboard and mouse events to web server to be performed on the web page. This connection is able to update the visual representations based on specific events or on a specific visual update rate.

According to some embodiments, to generate a VNC server instance with a playback engine, the playback engine may be containerized as its own playback server. Therefore, each VNC server instance is bound to a single, containerized task-specific VNC instance of the playback engine having an accessible address. Upon completion of a task, the task-specific VNC instance and the playback container are deleted.

Since the task-specific VNC instance is accessed over a network via a unique URL, the unique URL can be opened in a browser's WebView in order to display the VNC contents on a device (a laptop computer, a mobile phone, etc.). According to some embodiments, the unique URL may only be accessed temporarily. That is, the unique URL may expire after the task is completed. The expiry establishes that malicious users will be unable to see the contents of the task-specific VNC instance from another user's performance. Once the WebView displays the contents of the task-specific VNC instance, the users can interact with the playback server by clicking and typing on the VNC, controlling the VNC on the WebView in the same fashion a user would interact with a web page loaded without the use of VNC. Any data required by the playback server can also be signaled visually by injecting code into the of the task-specific VNC instance to modify the visual representation. For example, if the playback server indicates that a text entry field is necessary, the VNC server may superimpose a yellow highlight over a region including the text entry field. A user can respond to the changes requested by the playback server by interacting with the WebView displaying the contents of the task-specific VNC instance through clicking and typing actions. As another example, a given user can choose to intervene and select a cheaper Uber transportation or cancel booking a ride altogether if the given user feels that the fare price is too costly. The task-specific VNC instance may, in some embodiments, include a timeout functionality to stop task performance if a certain amount of time has passed. This timeout functionality is intended to prevent network congestion in the event the user has lost connection or is, for some reason, unable to complete the input.

Figure 4:
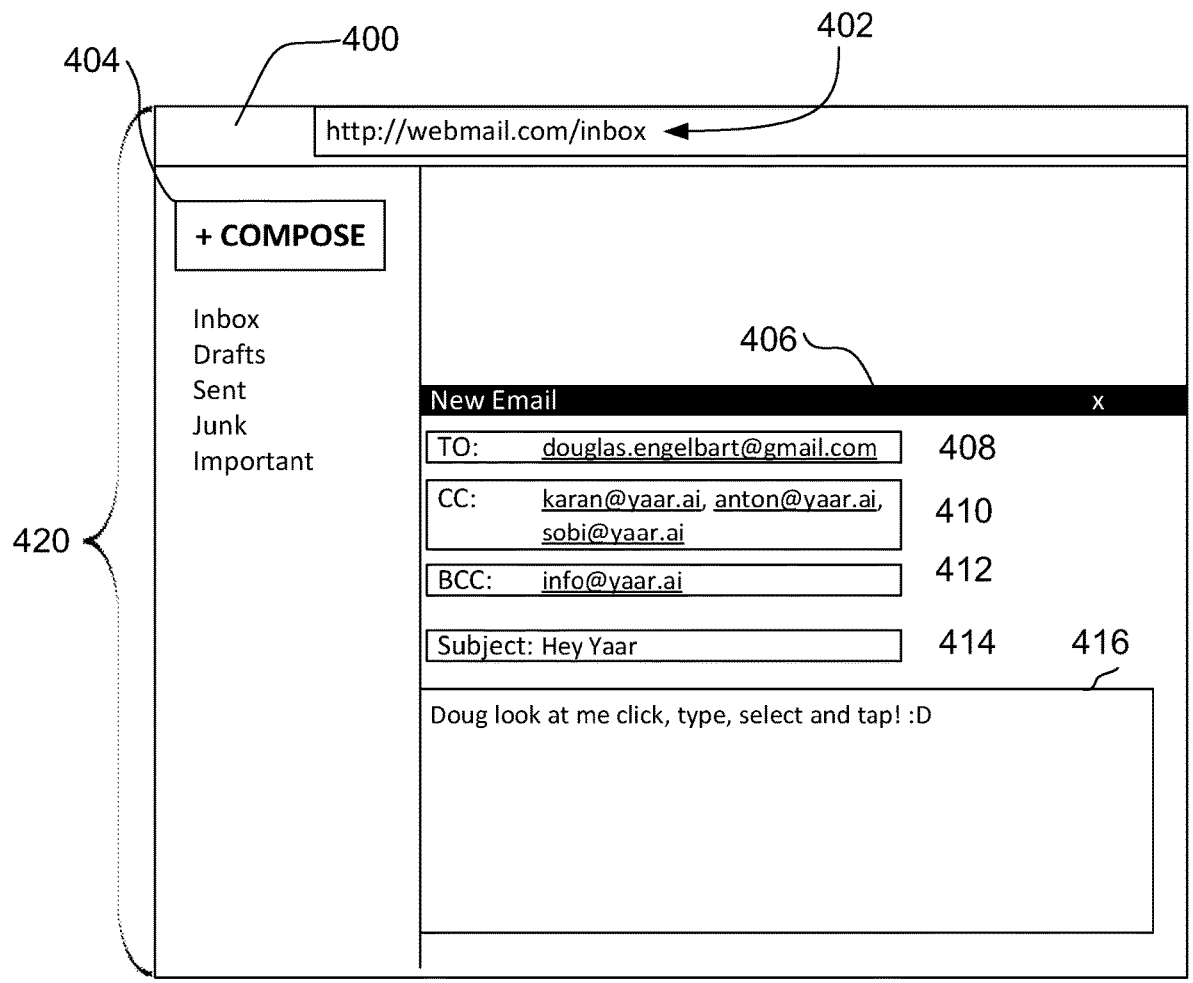
FIG. 4 illustrates a user interface of a web browser window, on a specific web page made up of web elements, according to one embodiment.

FIG. 4 is an example mock-up graphic user interface of a web browser window 400, on a specific web page made up of web elements 420. The web page may be retrieved from web hosting server 114 responsive to user device 104 transmitting a request identifying the web page by a uniform resource locator (i.e., a "URL") 402. In the example of FIG. 4, URL 402 corresponds to a web page for a web mail client for sending email messages. As can be seen, the web page includes a compose button 404, and a new email message window 406, including a TO field 408, a carbon copy (CC) field 410, a blind carbon copy (BCC) field 412, a subject field 414, and a message field 416. User 102 may, in interacting with browser window 400 on user device 104, request the web page identified by URL 402, and, subsequently, click on compose button 404 to cause new email message window 406 to pop up. User 102 may then populate TO field 408, CC field 410, BCC field 412, subject field 414, and message field 416. Each of these interactions may modify the web elements in object model 320 of the web page associated with URL 402. In traditional operation, user 102 would manually populate fields 408 to 414.

Figure 5:
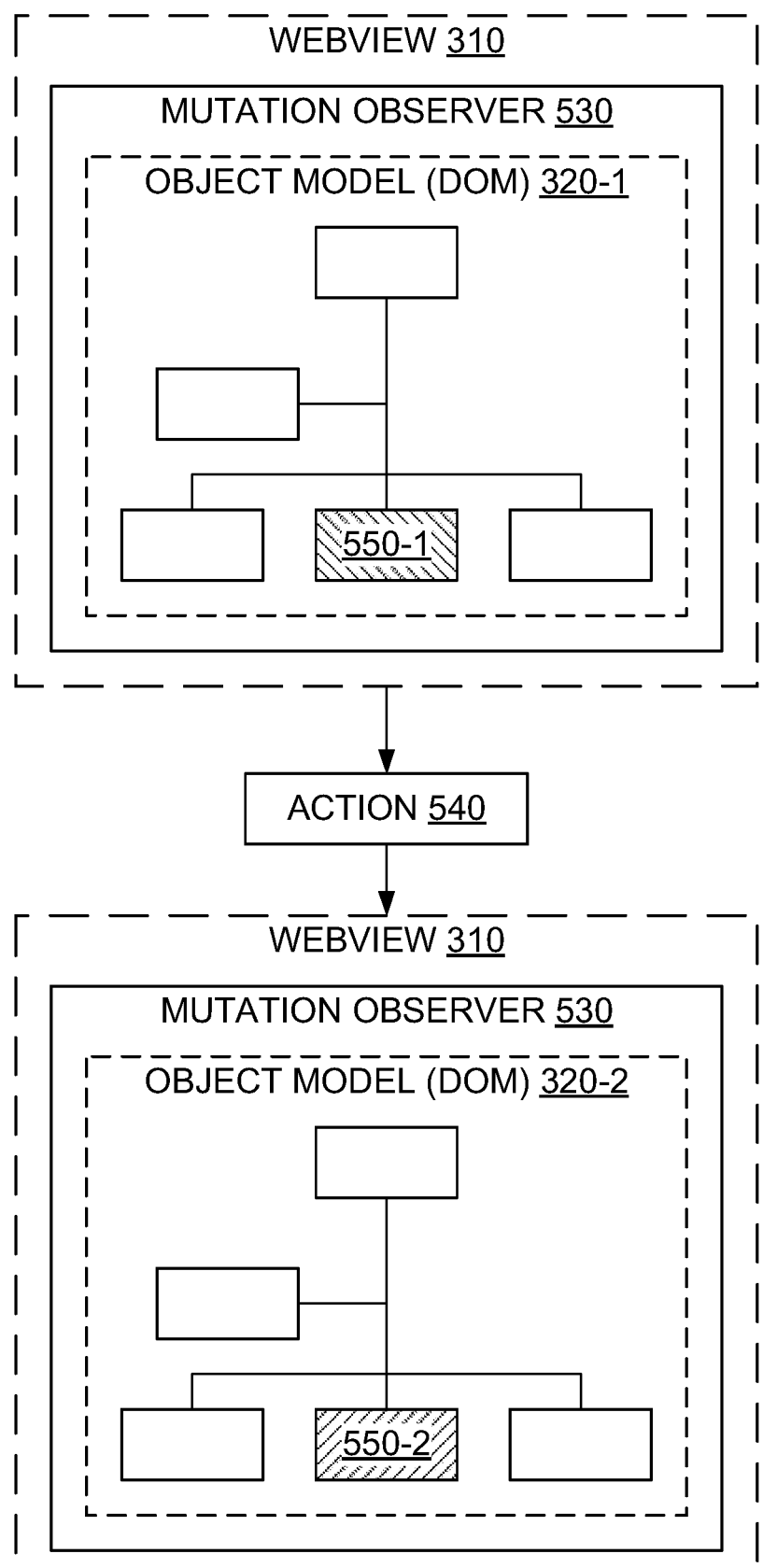
FIG. 5 illustrates a model of a manner in which components executed on the electronic device of FIG. 1 may track changes on a web page, according to one embodiment.

FIG. 5 illustrates a model of tracking changes on a web page, according to one embodiment. According to this embodiment, a mutation observer 530 is employed to detect a change in an initial object model 320-1, which has been generated by a webview 310. Responsive to an action 540 having taken place, FIG. 5 illustrates that a given web element differs between a given web element 550-1 in initial object model 320-1 and an updated given web element 550-2 in an updated object model 320-2. Action 540 may be seen to have caused webview 310 to generate updated object model 320-2. The mutation observer 530 can detect that updated object model 320-2 is distinct from initial object model 320-1, and can identify that the change was in given web element 550-1. Action 540 that caused the change from initial object model 320-1 to updated object model 320-2 may have been a user input event, such as clicking, typing, hovering, scrolling, etc. Action 540 can also have been a change in the web page itself, such as a new email having been received in an inbox, any other web element changing based on any user input or an internal piece of software designed to cause initial object model 320-1 to become updated object model 320-2.

While FIG. 5 illustrates a model of tracking changes on a web page using a webview 310, the changes may also be tracked in a similar manner using headless browser 219 configured to receive object models 320-1, 320-2.

Figure 6:
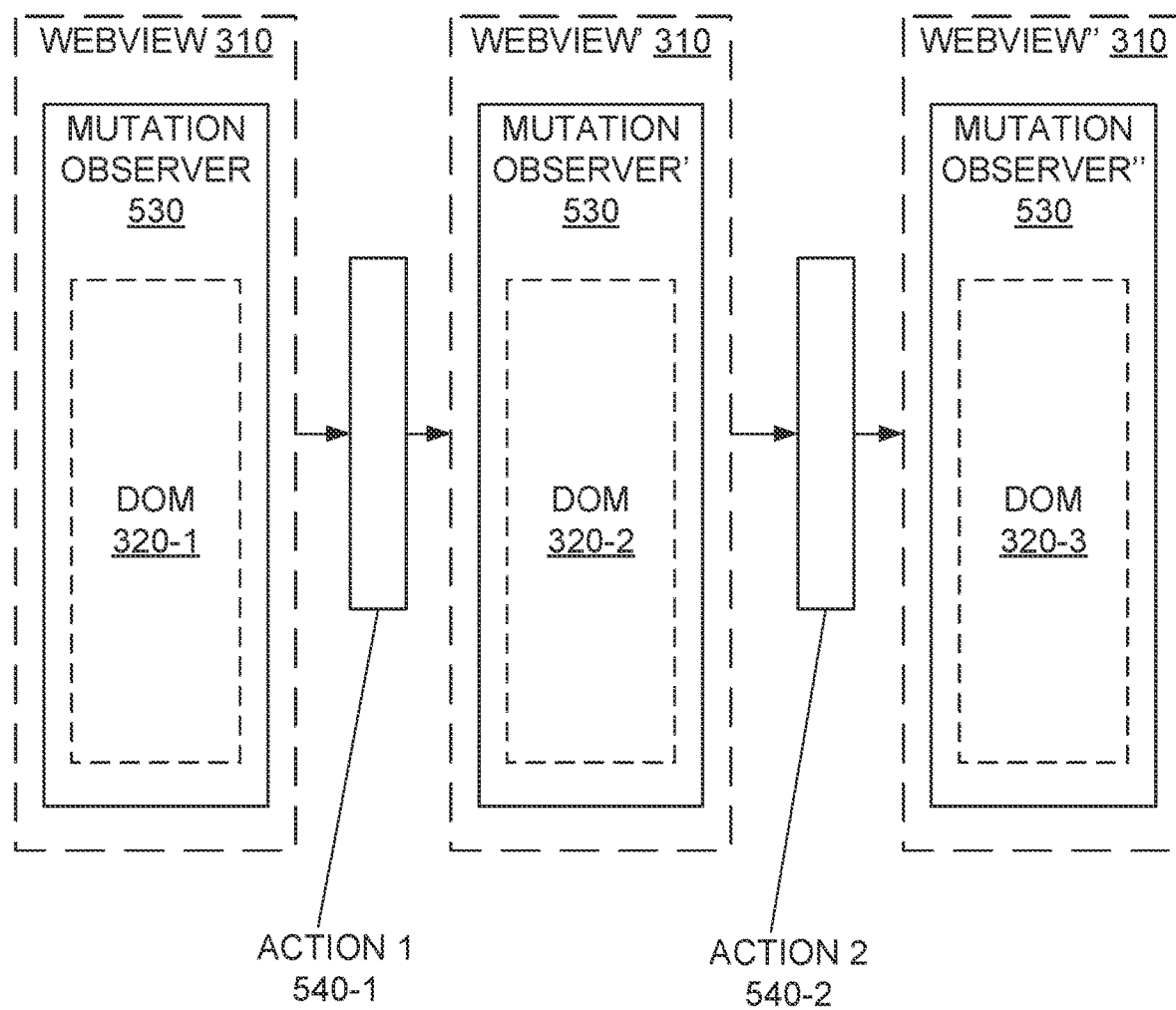
FIG. 6 illustrates a model including an object model processor that may be used for tracking changes on a web page, according to another embodiment.

FIG. 6 illustrates a model of tracking changes on a web page in webview 310, according to another embodiment. In FIG. 6, multiple actions (a first action 540-1 and a second action 540-2) have occurred, changing an object model from an initial object model 320-1 to a once-updated object model 320-2 and, finally, to a twice-updated object model 320-3. Mutation observer 530 detects a change from initial object model 320-1 to once-updated object model 320-2 caused by first action 540-1. Mutation observer 530 also detects a change from once-updated object model 320-2 to twice-updated object model 320-3 caused by second action 540-2. These changes and representations of initial object model 320-1, once-updated object model 320-2, and twice-updated object model 320-3 can be stored in a memory.

The model of tracking changes on a web page, as illustrated in FIG. 6, may be implemented using headless browser 219 in place of webview 310.

Figure 7:
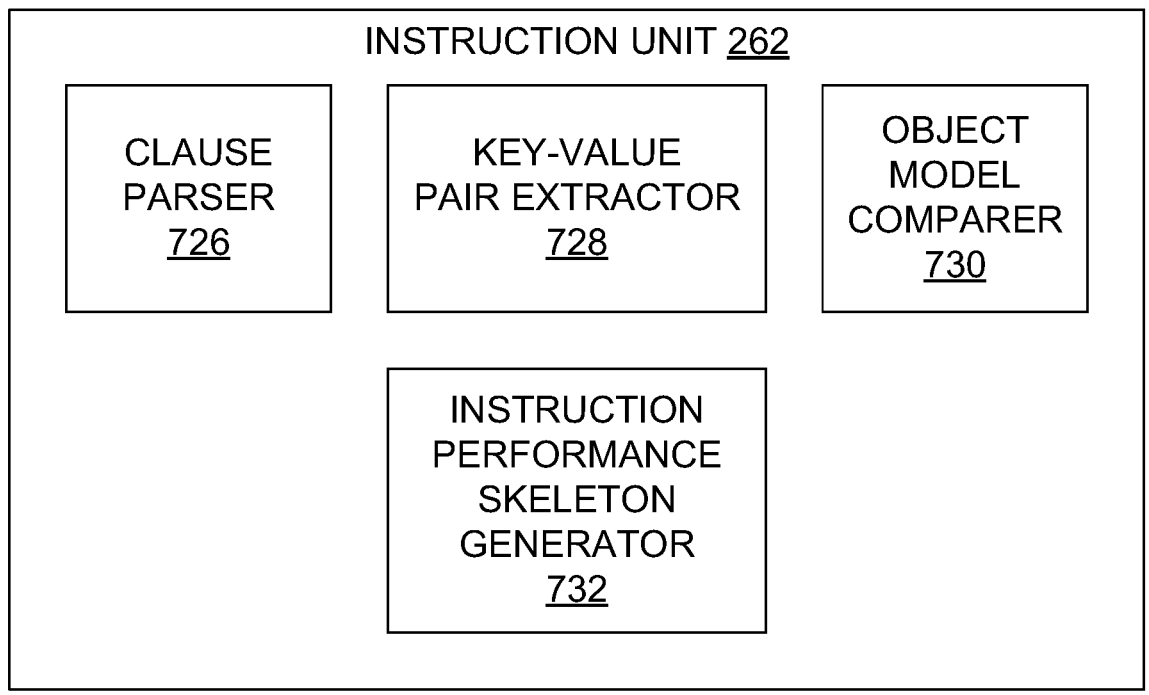
FIG. 7 illustrates an instruction unit operable to generate an instruction performance template based on a natural language instruction, according to one embodiment.

FIG. 7 illustrates a functional block diagram of subcomponents of instruction unit 262 of recording engine processor 252 of recording engine 250 (see FIG. 2), according to one embodiment. Instruction unit 262 includes a clause parser 726, a key-value pair extractor 728, an object model comparer 730 and an instruction performance skeleton generator 732 (collectively "instruction blocks"). Each instruction block in the functional block diagram of FIG. 7 may be operated by processor 252 of recording engine 250, according to some embodiments. According to other embodiments, the instruction blocks may be performed by separate processors or across multiple servers. The individual instruction blocks are configured to be able to communicate with each other, by sharing, reading and writing access to memories stored in servers, raising indicator flags, etc. The individual functions of clause parser 726, key-value pair extractor 728, object model comparer 730 and instruction performance skeleton generator 732 will be described in relation to later figures.

FIG. 8 illustrates an example natural language instruction 800, according to some embodiments. Example natural language instruction 800 relates to a request to retrieve pieces of information by performing specific actions on a web page, such as clicking, typing, etc. Example natural language instruction 800 relates to searching on Google Maps™ for the estimated distance and time to both drive to and walk to the nearest Starbucks™. Example natural language instruction 800 includes phrases like "select" and "enter," which may correspond to mouse (or touchscreen) interactions and text entry interactions.

It will be readily understood that natural language instructions may include multiple sentences, clauses, and logical operands for performance of a task. This represents a multi-step instructional command in plain language. The operation can take place across multiple different websites and the actions taken may be determined based on intermediary steps within the natural language instruction. For example, an alternative natural language instruction could include logical operators such as "if the driving time is less than five minutes, then tell me the walking time." Alternative logical operators may be "and," "or," or any others that may suit a task. In operation, the system receives, as an input, a natural language instruction including multiple individual steps and generates an instruction performance skeleton based on the individual steps.

According to some embodiments, the natural language instruction may relate to multiple websites. As another example, a natural language instruction may include instructions related to a task of sending email messages within a web email client, then, based on the output, scheduling a calendar event:

Send an email through Gmail™ to James, Jordan, and Kevin. The subject line should be "Meeting on Wednesday" and the body text should invite them to a meeting at my office Wednesday afternoon at 2 PM. If everyone responds affirmatively, enter a calendar event in my Google Calendar™ for that time inviting all of them.

Turning to FIG. 9, an example sequence 900 is illustrated. Example sequence 900 is a table including a clause column 904 of individual clauses arranged in an order of discrete steps indexed in a step column 902. Clauses in clause column, according to some embodiments, may be in plain language extracted from or interpreted from a natural language instruction. Clauses in clause column 904 in FIG. 9 have been extracted from natural language instruction 800 (FIG. 8). According to other embodiments, clauses in a clause column may be in a computer-readable pseudocode extracted from received natural language instruction. In operation, clause parser 726 may generate a sequence, similar to example sequence 900 of FIG. 9, based on a natural language instruction.

Figure 10:
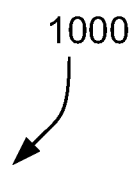
FIG. 10 illustrates an example database of key-value pairs, according to one embodiment.

FIG. 10 illustrates an example database 1000 of key-value pairs. A key-value pair includes a key in a key column 1002 and a value in a value column 1004. Example database 1000 of key-value pairs is presented in the form of a table populated with example data for illustrative purposes. As can be seen, the key-value pairs in example database 1000 are for use in searching for the location of "Starbucks™" in Google Maps and returning the distance and time for walking to the location and driving to the location. According to some embodiments, in operation, key-value pair extractor 728 may generate key-value pairs for a task based on a sequence similar to example sequence 900 of FIG. 9. According to other embodiments, key-value pair extractor 728 may generate key-value pairs for a task based on a natural language instruction similar to example natural language instruction 800 of FIG. 8. For each key in key column 1002, a corresponding value in value column 1004 is established. The key represents a variable for the task operation and the value represents the value associated with the key.

FIG. 11 illustrates example instruction performance skeleton 1100 in the form of a database, according to one embodiment. Example instruction performance skeleton 1100 represents a sequential set of steps indexed in a step column 1102. The sequential set of steps are related to the performance of a task on a web page or multiple web pages. Example instruction performance skeleton 1100 of FIG. 11 is derived from example sequence 900 of FIG. 9, the key-value pairs in example database 1000 (each key-value pair may be derived, in part, from example natural language instruction 800 of FIG. 8), and an object model for a web page. Example instruction performance skeleton 1100 represents a model for automated performance of the task as described in example natural language instruction 800 of FIG. 8. For example, example natural language instruction 800 requests finding the driving distance and the walking distance in Google Maps for the location of the nearest Starbucks™ location. Example instruction performance skeleton 1100 includes actions to be included in action messages for performance of the task. An instruction performance skeleton may be generated from any web page having an object model.

Example instruction performance skeleton 1100 of FIG. 11 has been populated with example data for illustrative purposes. Example instruction performance skeleton 1100 includes indexes in step column 1102, a plurality of keys in a key column 1103 and values in a value column 1104, a plurality of object model action elements in an action element column 1106 and a plurality of actions in an action column 1108. Indexes in step column 1102 indicate an order for sequentially carrying out the actions in action column 1108 for each object model action element in action element column 1106. A specific object model action element in action element column 1106 may be referenced using the location within an object model (i.e., xPath) for the specific object model action element. Each action in action column 1108 could be a clicking action (such as a left click, a right click, a drag-and-drop, hover, scroll, a double click, etc.) or a text entry action. Each action in action column 1108 may require an input variable selected from among plurality of keys in key column 1103 and values in value column 1104, or may be an instruction to return or store a variable extracted from a web page. Each step may further be used to generate an action message, wherein the action message is for a browser to perform an action from action column 1108 on a web page.

For example, as can be seen in the row having an index, in step column 1102, with a value of 6, the corresponding action among the plurality of actions in action column 1108 (a text entry action) is performed on the corresponding object model element among the plurality of object model action elements in action element column 1106, the corresponding object model element "Body_Table_Div_TEXT-FIELD2." To perform the text entry action, the value "STARBUCKS" corresponding to key "LOCATION" is employed. The plurality of keys and values may be provided to recording engine 250 in a natural language instruction (as will be described in relation to later figures), or may be returned from the system to the user interface based on the performance of the task, which will be described hereinafter.

According to some embodiments, the instruction performance skeleton may include additional commands or structure similar to a Turing-complete programming language, to be used in task performance. For example, instruction performance skeleton may include an instruction including a conditionality such as an if statement for performance of a specific action. Additionally, the instruction performance skeleton may include instructions to perform functional loops such as a while loop or for loop, indicative of repeating specific actions until a conditionality is satisfied.

Figure 12:
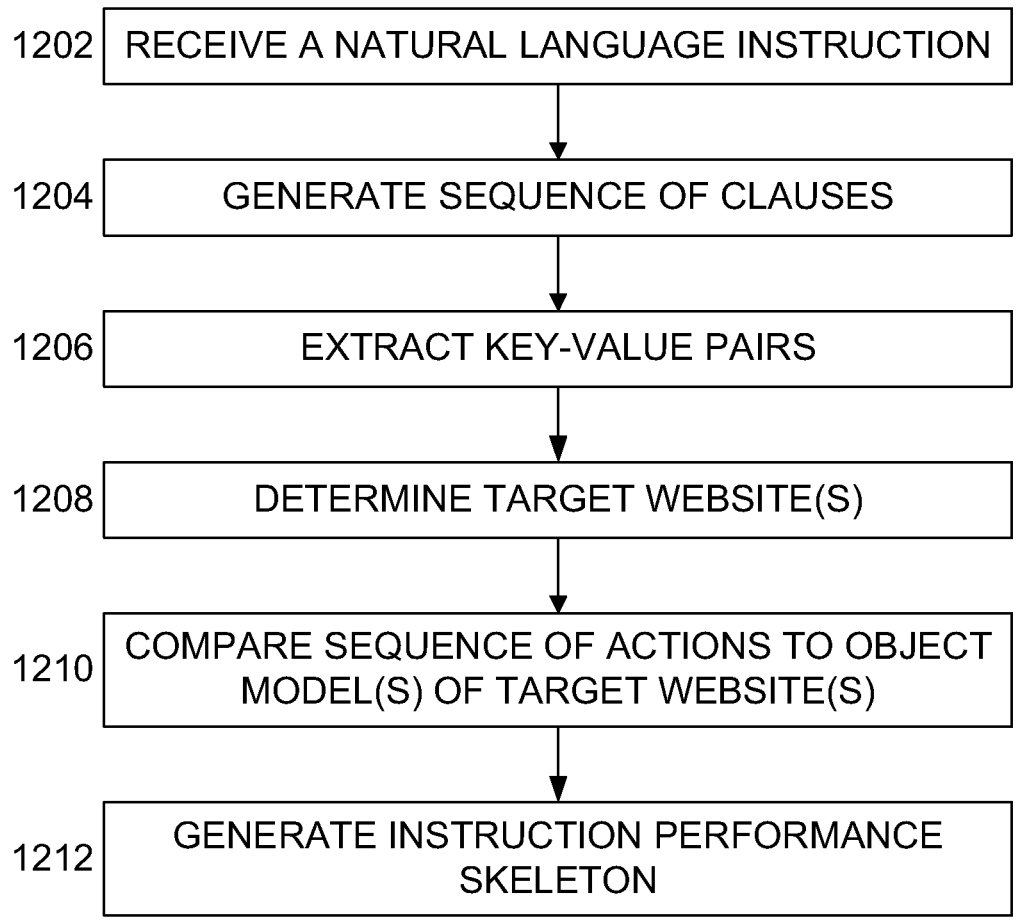
FIG. 12 illustrates example steps in a method of generating an instruction performance template, according to one embodiment.

FIG. 12 illustrates example steps in a method of deriving an instruction performance skeleton at intent matcher 256. A natural language instruction is entered by user 102, say through user interface 158, and received (step 1202) by intent matcher 262 and sent to clause parser 726. The natural language instruction may take the form of example natural language instruction 800 shown in FIG. 8, i.e., describing a sequence of actions user 102 would take using user device 104 to perform a task. This sequence of actions can include multiple websites, or logical stems or if-statements based on the individual action.

A sequence of clauses may then be generated (step 1202) by clause parser 726. The sequence may take a form similar to example sequence 900 (see FIG. 9) and be designed to represent an ordered sequence of clauses. The clauses may be in natural language or a computer-readable pseudocode for ordered individual steps, based on natural language instructions. Further, the sequence of clauses may contain multiple parallel steps to be performed simultaneously throughout multiple webviews or multiple headless browsers. Therefore, the sequence as generated in step 1202 can include a plurality of stems. For example, a sequence may include two parallel stems to indicate concurrent performance of a search for the transit option of driving and a search for the transit option of walking, each in two different webviews or two different headless browsers. Clause parser 726 may interpret the natural language instruction to determine specific clauses.

The key-value pairs are then extracted (step 1204). The key-value pairs may be extracted from a sequence similar to example sequence 900 or may be extracted directly from a natural language instruction similar to example natural language instruction 800. Key-value pair extractor 728 may identify key-value pairs from the natural language instruction. A key-value pair comprises a key variable and a value variable. The key represents the variable type or a title for the value variable and the value variable represents the data to be stored in association with the specific key. A single natural language instruction can include enough information to allow for the extraction (step 1204) of a plurality of key-value pairs. For example, key-value pairs extracted (step 1204) from example natural language instruction 800 may take the form of the key-value pairs shown in FIG. 10. However, any other form or structure of key-value pairs may be used. Further, the number of, and type of, return values may be dynamically interpolated from the natural language instruction.

Extracting (step 1204) is performed by key-value pair extractor 728 analysing the natural language instruction according to a text analysis algorithm. Known text analysis algorithms include general-purpose language representation models, such as the "distilBERT" model or the Dual Intent Entity Transformer (DIET) model. The text analysis algorithm functions to identify keys and values. One method of identifying keys is to maintain a library of keywords and their synonyms. Thereby, key-value pair extractor 728 can search for a phrase that closely matches any of the keywords and select the match for the key as determined. For example, phrases such as "how far to," "where is," "how long to," all imply a search for a location or distance. Key-value pair extractor 728 may be configured to comprehend these and determine an appropriate key to insert into key column 1002.

In aspects of the present application, key-value pair extractor 728 may analyse a received natural language instruction to determine whether all the necessary information to perform a task has been extracted. This may be done by key-value pair extractor 728 comparing key-value pairs, extracted from the received natural language instruction, to a predefined library of task information. For example, an email message may be sent without a subject or a body. The library may include, for a task related to sending an email message the following fields:

Mandatory:
  Recipient
Prompt if not received:
  Subject
  Body
Optional:
  CC
  BCC Once key-value pair extractor 728 has identified the task to be performed, key-value pair extractor 728 can determine whether contents for the mandatory fields, prompt fields, and optional fields have been extracted. If there are no key-value pairs corresponding to the mandatory fields or to the prompt fields, playback engine 210 may arrange that user 102 receives prompting for additional clarification on user device 104. User 102 may, responsive to the prompting, then identify content for the mandatory fields, or opt out of using the prompt fields. According to some embodiments, specific fields may be remembered as user settings within a memory and populated automatically. For example, key-value pair extractor 728 may have access to a contact book. Thereby, only using a first name of a person in the received natural language instruction may be sufficient to generate a recipient for an email message, if key-value pair extractor 728 has been configured to query the contact book to find the email address of the person with the first name.

If there are explicit keys or values that key-value pair extractor 728 has determined are not found in the received natural language instruction, key-value pair extractor 728 may also send a message to user 102 through user device 104 to request clarification of the specific task. For example, if the received natural language instruction did not include the "Google Maps" (i.e., just stated "Search for Starbucks and click on directions . . . ") key-value pair extractor 728 may prompt user 102 to enter or select an app or web service to which to submit the query. Further, key-value pair extractor 728 may analyze the logical structure of the received natural language instruction. Key-value pair extractor 728 may determine whether the received natural language instruction contains all the necessary keys and values to consider conditionality in a task performance.

Based on the key-value pairs extracted in step 1204, target website or websites may be determined (step 1206), also by key-value pair extractor 728. According to some embodiments, this determining is done by determining a website or specific web page for the received natural language instruction, based on the key-value pairs extracted in step 1204. An indication of the website may be sent to browser 150 to load in webview 310 or sent to headless browser 219. In either case, an object model may be generated and stored for the website. According to embodiments, where the received natural language instruction includes multiple target websites, multiple websites or web pages may be determined in step 1206.

Next, the sequence, as generated in step 1204 by clause parser 726, and the key-value pairs, as determined in step 1206 by key-value pair extractor 728, are compared to object models 320 of the target websites (step 1210). First, browser 150 or headless browser 219 generates an object model by loading the web page. The object model may be of a form similar to the object model 320 illustrated in FIG. 3, wherein the object model has a hierarchical tree structure, having labels indicative of classes, divs, aria-labels, and other html attributes. The titles of different tags may provide meaning to the web elements, which they represent. For example, a specific element may have a label indicating that the specific element contains a text field relating to the start location of a search result. One example of a labelling protocol is the known set of Accessible Rich Internet Application (ARIA) labels. Object model comparer 730 has access to object model structure, including semantic heuristics like class name, aria-label, text, and any other html attribute. Object model comparer 730 determines the location corresponding to the web element (i.e., an XPath) and determines the action to perform on the web element. In the case wherein there is no uniquely identifiable label, the xPath may be found for the target element using other heuristics, which do not, necessarily, rely on textual information (such as, for example, a cartesian coordinate relative to a browser window or another web element).

According to some embodiments, object model comparer 730 compares (step 1210) each clause in the sequence generated in step 1208 to a web element, wherein each web element has a corresponding branch in the object model. Object model comparer 730 may generate or calculate a numerical vector representation of each action in the sequence, along with each branch of the object model. Individual components of the vector representation of the branches in the object model may be representative of the class, type, content, etc. of the object model. Individual components of the vector representation of the actions may be representative of the keys, values, sequence, or any other information. The vector representations may be compared, by object model comparer 730, and a similarity score may be a result of the comparing. For example, the similarity score can be related to aggregate cosine distances based on a comparison of a vector representation of an action and a vector representation of a branch of the object model. The object model for each action may then be selected.

Based on the comparisons performed in step 1210, instruction performance skeleton generator 732 may generate (step 1212) an instruction performance skeleton. The instruction performance skeleton generated in step 1212 may take a form similar to example instruction performance skeleton 1100 (FIG. 11). The instruction performance skeleton generated in step 1212 may be made up of ordered actions on specific web elements based on the sequence within the object model using key-value pairs, as defined by the received natural language instruction. The generated instruction performance skeleton may be stored in task database 222 of playback engine 210.

Aspects of the present application relate to controlling performance of a task on a web page using performance controller 223 of playback engine 210 (FIG. 2). Controlling performance of a task on a web page may be guided by a playback performance skeleton. The playback performance skeleton may be based on an instruction performance skeleton. An example instruction performance skeleton 1100 is illustrated in FIG. 11. Performance controller 223 of playback engine 210 is communicatively linked over network 112 with browser 150, headless browser 219 and recording engine 250, receiving information and sending messages to perform tasks autonomously.

Figure 13:
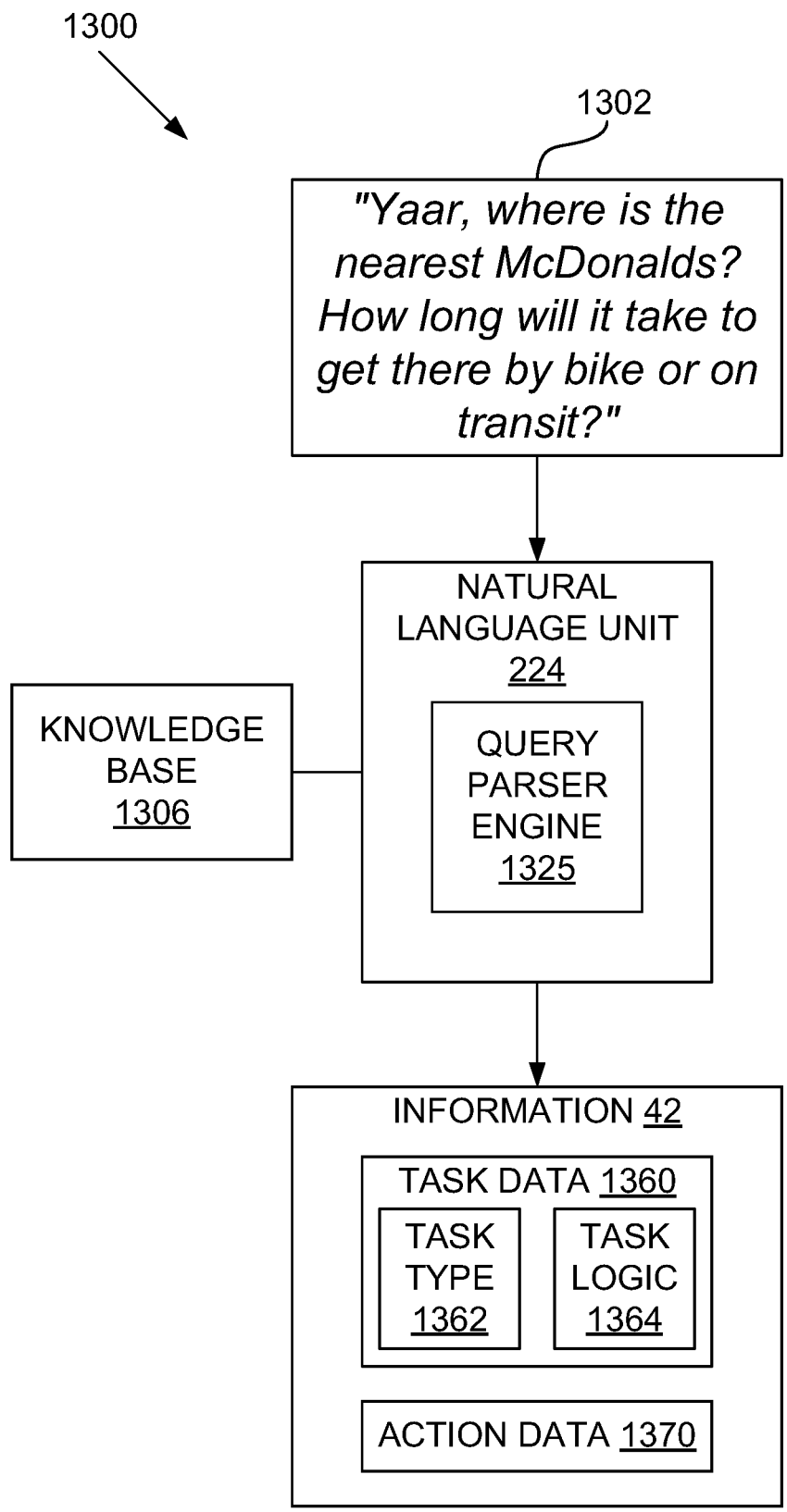
FIG. 13 illustrates a natural language unit operable to determine a task to perform on a web page, according to one embodiment.

FIG. 13 illustrates receipt, by NLU 224, implemented by playback engine processor 210 (see FIG. 2), of a natural language input 1302. According to some embodiments, NLU 224 receives natural language input 1302 from user 102 via user interface 158 of user device 104. Natural language input 1302 is expected to be indicative of a task to be carried out on one or more web pages. NLU 224 includes a query parser engine 1325 that is configured to derive, from natural language input 1302, information 42 about the task to be carried out. Auxiliary information used to supplement deriving information 42 may be stored in an internal knowledge base 1306 accessible by NLU 224. Information 42 may include specific task data 1360, such as a task type 1362 and a task logic 1364 for use in various decision-making processes, along with action data 1370 related to individual actions that are to occur during the carrying out of the task. Task type 1362 may be indicative of the type of task to perform, i.e., specific instruction performance skeleton to use in performing the task. Task logic 1364 be used in the case where natural language input 1302 includes multiple tasks to perform, indicating how the multiple tasks should be carried out, identifying a final end task (for example, how/if a calendar event should be scheduled based on the response to an email message) if decisions should be made in automation. Action data 1370 may include specific variables 1304 to be used for the task in the form of key-value pairs similar to the key-value pairs in example database 1000 of FIG. 10. In a manner similar to the extraction described in relation to step 1206 of FIG. 12, key-value pairs may be extracted from natural language input 1302 using a text analysis algorithm, such as the distilBERT model or the DIET model. According to some embodiments, NLU 224 may return, to user device 104, a query requesting additional information required to perform the task.

According to some embodiments, for some ambiguous natural language inputs, NLU 224 can first attempt to narrow down a target task using internal knowledge base 1306. Internal knowledge base 1306 may be used to interpret specific elements within natural language input 1302, such as, for example, knowing that "my office" refers to a specific address. Knowledge base 1306 may also be used to determine the most appropriate suggestions to be presented to a user. For example, if asked to find a coffee shop, using locational data to find those coffee shops close to the user based on a stored location. As another example, if user inputs, as a natural language input 1302, "Send a meeting invite to the HR team at the office for tomorrow," knowledge base 1306 may have enough information for NLU 224 to fill in details, such as a complete address of "the office," a list of people belonging to "the HR team," with their corresponding email addresses, and a time to have the meeting based on the previous times that the user has had meetings with the HR team.

According to some embodiments, knowledge base 1306 may comprise a plurality of database entries for an individual user 102. Entries may be structured in a relational or graph database. These database entries in knowledge base may be sourced from a social media account (such as Facebook™, Twitter™, Instagram™, WhatsApp™, Slack™, etc.), or may be generated based on a user input. Each social media account may be used to determine preferences and information about a user 102. For example, knowledge base 1306 may indicate that user 102 interacts with a person having multiple titles or nicknames. For example, the same contact entitled "Alexander" in an email web app may be called "Alex" in slack and "Dad" in WhatsApp.

If the database entries are stored in a graph database, various relational evaluation metrics may be employed, such as Jaro distance, Levenshtein distance, Jaccard index, etc. Based on these relational evaluation metrics, knowledge base 1306 may determine whether certain social media accounts belong to the same person. For example, knowledge base 1306 may be structured to determine the distance between two nodes, one node derived from a Twitter account and one node derived from an Instagram account. If the calculated distance between two nodes is below a threshold, knowledge base 1306 may group the two accounts as relating to the same contact.

Additional information that may be stored in knowledge base may include:
  user's current location;
  work locations;
  home locations;
  locations that the user visits regularly;
  twitter handles;
  time zones;
  preferred languages;
  preferences for virtual meetings;
  preferences for in-person meeting (locations, coffee/breakfast/lunch/dinner, name, address and others);
  life events (new job, anniversary, recently moved, new home, sold home, away from family, away from hometown);
  relationship status (long-distance, open relationship, separated, single, married, widowed, complicated, new relationship, new parent, expecting parent, parent with a toddler and others);
  household composition (family-based household, housemate-based household and others); and
  any other potentially relevant data in automated communications.

Additionally, more attributes may be stored in the knowledge base relating to contacts of a user 102, for example:
  the relationship to the user (e.g., sister, colleague, roommate, etc.);
  home address;
  office location;

work;
education;
languages;
generation (baby boomer, generation X, millennial, generation Z);
birthday;
gender; and
if the contact is part of any team at the user's office and others.

Information in knowledge base may grow as the user uses the source social media applications, as well as through the user's natural language inputs 1302 over time. Information may be periodically updated or confirmed by the user over time. For example, information about a user's office location may be updated as the system determines a user might have switched jobs. Additionally, new information may be added to an entry in the knowledge base for the user, such as "has pet."

NLU 224, if instructed, may search the web to look for resources and references related to the entity. NLU 224 can also, in some cases, present user 102 with a plurality of structured input options from which a single structured input may be selected. As another example, within natural language input 1302 relating to finding a location, NLU 224 may be configured to recognize that the selected instruction performance skeleton includes keys that can be filled using task data 1360, such as a start location. According to some embodiments, NLU 224 may automatically search (via a database query) within a database associated with user 102 for their location (such as the knowledge base as previously described).

Figure 14:
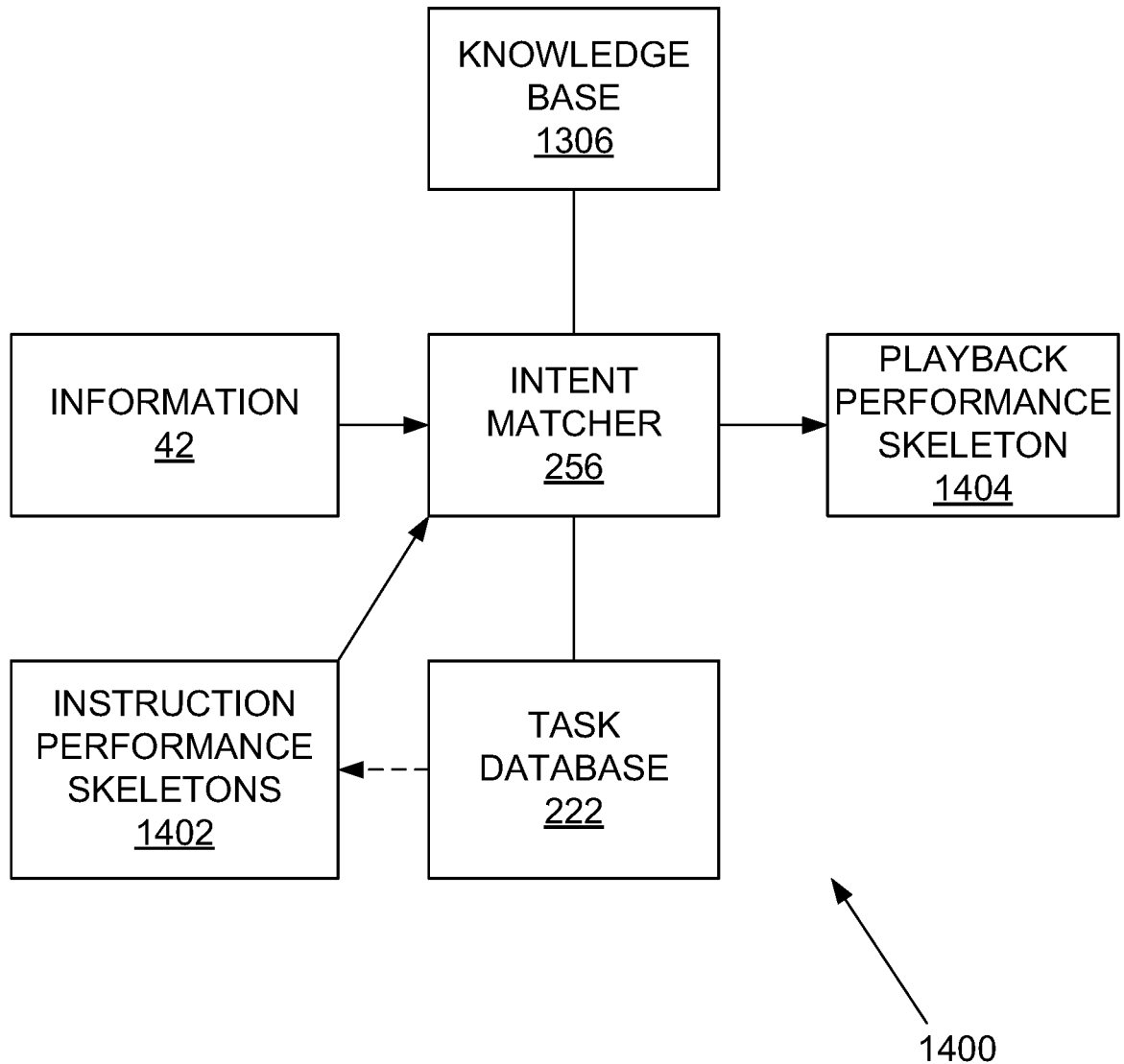
FIG. 14 illustrates a model including an intent matcher to generate a playback performance skeleton, according to one embodiment.

FIG. 14 illustrates a model 1400 including intent matcher 256 (FIG. 2) implemented by playback engine processor 214 (FIG. 2). In operation, information 42 (see FIG. 13) is received by intent matcher 256. Intent matcher 256 maintains access to task database 222 storing references to a plurality of instruction performance skeletons 1402, including a reference to example instruction performance skeleton 1100.

Example instruction performance skeleton 1100 is derived, for example, using the method described in FIG. 12. Based on information 42 and access to task database 222, intent matcher 256 determines that information 42 is associated with a task represented by a particular instruction performance skeleton referenced in task database 222 and then generates a playback performance skeleton 1404. The playback performance skeleton 1404 may then be used as an instructional guide for allowing playback engine 210 to arrange performance of the task with respect to a web page.

FIG. 15 illustrates an example playback performance skeleton 1500, according to one embodiment. Example playback performance skeleton 1500 is in the form of a table and is populated with example data for illustrative purposes. Generating example playback performance skeleton 1500 may be understood, in view of FIG. 14, to have made use of a combination of information 42 derived from natural language input 1302 (see FIG. 13) and an instruction performance skeleton, among plurality of instruction performance skeletons 1402, referenced in task database 222. Example playback performance skeleton 1500 illustrated in FIG. 15 includes the same information as example instruction performance skeleton 1100 illustrated in FIG. 11, namely: indexes in a step column 1502; keys in a key column 1503 with corresponding values in a value column 1504; object model xPaths in an object model location column 1506; and actions in an action column 1508. To arrive at example playback performance skeleton 1500, it may be understood that intent matcher 256 has inserted, into value column 1504, values included in information 42. According to some embodiments, the index in step column 1502 of example playback performance skeleton 1500 dictates an order for action messages to be sent from performance controller 223 to, for example, headless browser 219.

Figure 16:
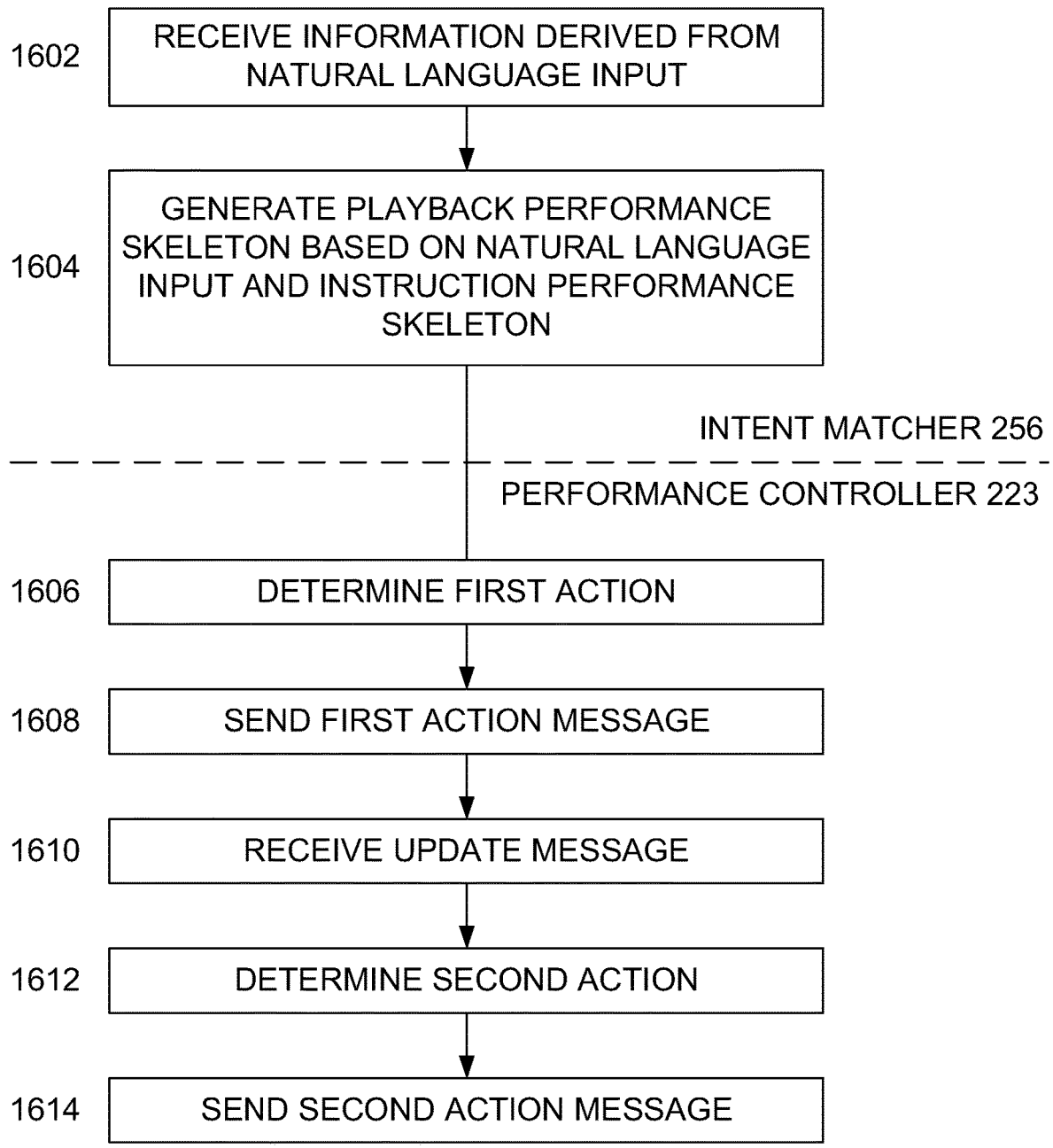
FIG. 16 illustrates example steps in a method of executing a task on a web page, according to one embodiment.

FIG. 16 illustrates example steps in a method of executing a web task on a web page based on natural language input, according to one embodiment.

Initially, intent matcher 256 receives (step 1602) information 42 derived from natural language input 1302 (see FIG. 13). Natural language input 1302 could be a text message input through a chat window or may be a voice input converted to text using speech-to-text algorithms. Natural language input 1302 may be indicative of a task to be performed and may include information specifying details related to the performance of the task.

Intent matcher 256 may generate (step 1604), based on information 42 and example instruction performance skeleton 1100 referenced in task database 222, playback performance skeleton 1404 similar to example playback performance skeleton 1500. Generating (step 1604) playback performance skeleton 1404 can not only include resolving the intent of information 42 but can also include resolving missing or ambiguous task-related details. The task relating to information 42 may be the same as, or similar to, the task taught by example natural language instruction 800 (FIG. 8) that was provided to instruction unit 262 and led to generation (step 1212, FIG. 12) of example instruction performance skeleton 1100, referenced in task database 222, on which generation of example playback performance skeleton 1500 is based.

Therefore, performance (playback) of the task can be guided by example instruction performance skeleton 1100 generated using an instruction performance skeleton generation method, example steps of which are illustrated in FIG. 12. In view of FIG. 14, playback performance skeleton 1404 may be generated (step 1604) by intent matcher 256 extracting key-value pairs from information 42, determining which, among plurality of instruction performance skeletons 1402 referenced in task database 222 to use, and generating playback performance skeleton 1404 by inserting, into a value column, values derived from information 42.

In consideration of example playback performance skeleton 1500 of FIG. 15, performance controller 223 may determine (step 1606), from a row in example playback performance skeleton 1500, a first action in the row, in the action column 1508. Performance controller 223 may prepare a first action message including instructions causing a webview or a headless browser to perform the first action on a web page. The first action may be a mouse click, a mouse scroll, a mouse cursor hover, a drag-and-drop, or a keyboard input, simulating what would have been an input event from user 102 interacting with user interface 158 of user device 104. According to some embodiments, the first action message may be sent (step 1608) from a server hosting playback engine 210.

Upon receipt of the first action message, the webview or the headless browser can then perform the first action on the web page. The performance of the first action can cause a change in the object model. As discussed hereinbefore, the object model may be a hierarchical tree structure rendering of a web page like the known DOM.

Subsequent to the performing of the first action, an update message is received (step 1610) by performance controller 223 from the webview or the headless browser that carried out the first action. The update message may indicate a change in the object model. The change may, for example, be detected by mutation observers 530 that observe changes that have taken place in the object model and in which elements of the object model the changes have taken place. According to some embodiments, the change detected in the object model may be caused indirectly by the performance of the first action. For example, if the first action was "send an original email message," one of mutation observers 530 may detect that a response email message to the original email message has been received.

Performance controller 223 may next determine (step 1612) a second action to be performed. The determining (step 1612) the second action to be performed may be based on the change in the object model. According to some embodiments, the change in the object model may be detected as having been completed after multiple changes in the object model have occurred. For example, if, in response to the first action, multiple new elements have been generated in the web page and, consequently, in the object model of the web page, the change may not be considered to have completed occurring until each of the changes in the object model are complete. The determining (step 1612) the second action to be performed may be based on selecting a subsequent row, based on the index in step column 1502, in example playback performance skeleton 1500.

Performance controller 223 may then send (step 1614) a second action message. The second action message may, for example, contain instructions for the webview or headless browser to perform the second action on the web page.

According to some embodiments, the webview or headless browser receives the second action message from performance controller 223. Performance controller 223 may continue to receive update messages, determine subsequent actions and send action messages for the subsequent actions until there are no further actions in example playback performance skeleton 1500.

Figure 17:
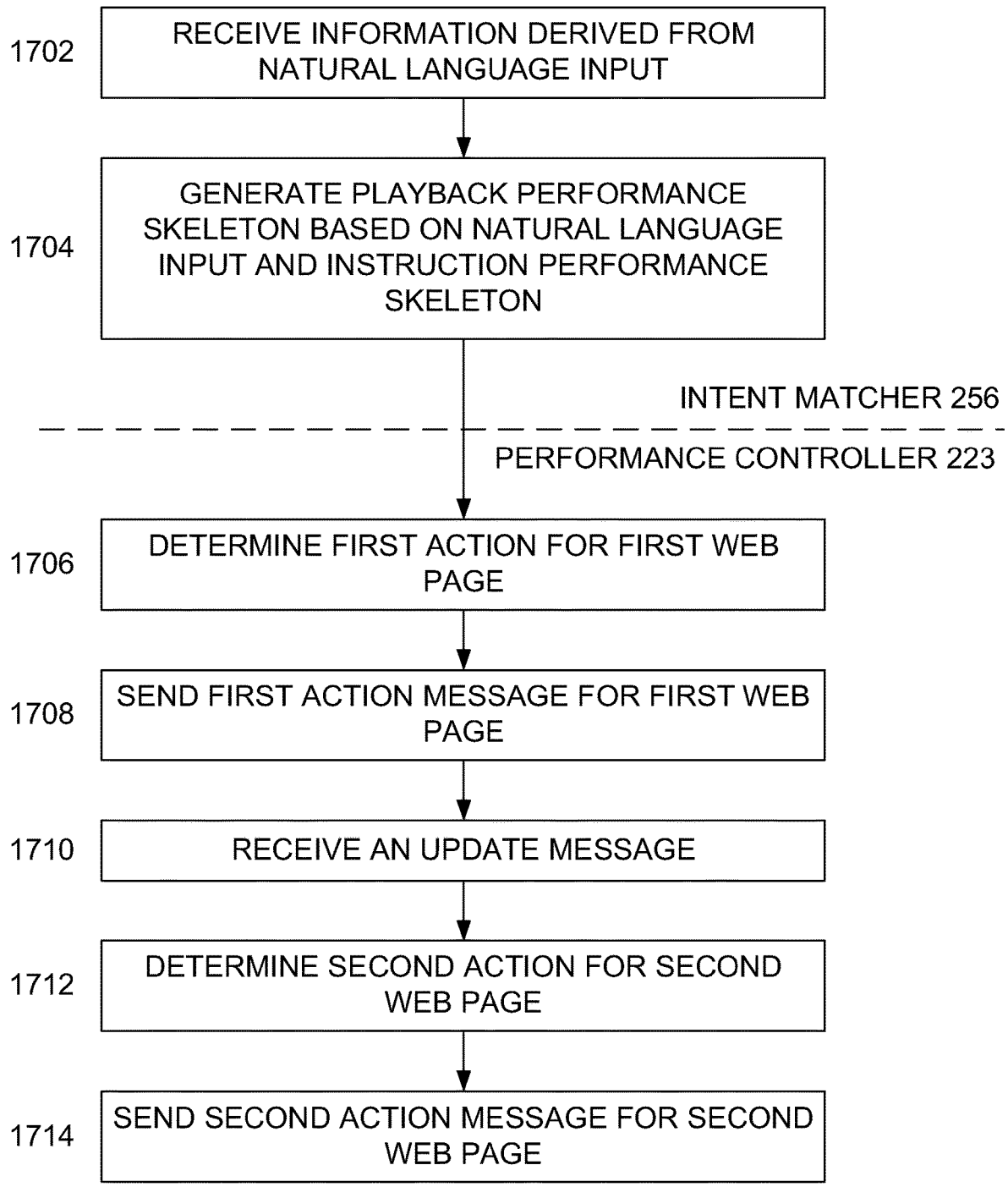
FIG. 17 illustrates example steps in a method of executing a task across two web pages, according to one embodiment.

FIG. 17 illustrates example steps in a method of executing a task on two web pages, according to one embodiment.

Initially, intent matcher 256 receives (step 1702) information 42 derived from natural language input. Natural language input 1302 could be a text message input through a chat window or may be a voice input converted to text using speech-to-text algorithms. Natural language input 1302 may be indicative of a task to be performed and may include information specifying details related to the performance of the task.

Intent matcher 256 may generate (step 1704), based on information 42 and example instruction performance skeleton 1100 referenced in task database 222, playback performance skeleton 1404 similar to example playback performance skeleton 1500. Generating (step 1704) playback performance skeleton 1404 can not inly include resolving the intent of information 42 but can also include resolving missing or ambiguous task-related details. The task relating to information 42 may be the same as, or similar to the task taught by a example natural language instruction 800 (FIG. 8) that was provided to instruction unit 262 and led to generation (step 1212, FIG. 12) of example instruction performance skeleton 1100, referenced in task database 222.

Therefore, performance (playback) of the task can be guided by example instruction performance skeleton 1100 generated using an instruction performance skeleton generation method, example steps of which are illustrated in FIG. 12. In view of FIG. 14, playback performance skeleton 1404 may be generated (step 1704) by intent matcher 256 extracting key-value pairs from information 42, determining which, among plurality of instruction performance skeletons 1402 referenced in task database 222 to use and generating playback performance skeleton 1404 by inserting, into a value column, values derived from information 42.

In consideration of a playback performance skeleton (not shown) distinct from example playback performance skeleton 1500 of FIG. 15, performance controller 223 may determine (step 1706), from a row in the playback performance skeleton, a first action. Performance controller 223 may prepare a first action message including instructions causing the webview or the headless browser to perform the first action on a first web page. The first action may be a mouse click, a mouse scroll, a mouse cursor hover, a drag-and-drop, or a keyboard input, simulating what would have been an input event from user 102 interacting with user interface 158 of user device 104. According to some embodiments, the first action message may be sent (step 1708) from performance controller 223.

Once performance controller 223 has sent (step 1708) the first action message, the webview or the headless browser can then perform the first action on the first web page. The performance of the first action can cause a change in the object model. As discussed hereinbefore, the object model may be a hierarchical tree structure rendering of a web page like the known DOM.

Subsequent to the performance of the first action, an update message is received (step 1710), by performance controller 223, from the webview or the headless browser that carried out the first action. The update message may indicate a change in the object model. The change may have been detected by mutation observers 530 that observe changes that have taken place in the object model and observe in which elements of the object model the changes have taken place. According to some embodiments, the change detected in the object model may be caused indirectly by the performance of the first action. For example, if the first action was "send an original email message," one of the mutation observers 530 may detect that a response email message to the original email message has been received.

Performance controller 223 may next determine (step 1712) a second action to be performed on a second web page. The determining (step 1712) the second action to be performed may be based on the change in the object model of the first web page. According to some embodiments, the change in the object model may be detected as having been completed after multiple changes in the object model have occurred. For example, if, in response to the first action, multiple new elements have been generated in the web page and, consequently, in the object model of the web page, the change may not be considered to have completed occurring until each of the changes in the object model are complete. The determining (step 1612) the second action to be performed may be based on selecting a subsequent row, based on the index in step column 1502, in example playback performance skeleton 1500.

Performance controller 223 may then send (step 1714) second action message. The second action message may, for example, contain instructions for the webview or the headless browser to perform the second action on the second web page. According to some embodiments, the second action message is sent from performance controller 223. Performance controller 223 may base the second action message on the indication of the change in the object model or on the previous action. The second action message may also be a sequential action based on the task data previously defined in the recording steps or stored in a recording library. Performance controller 223 may continue to receive update messages, determine subsequent actions and send action messages for the subsequent actions until there are no further actions in the playback performance skeleton.

Although the present invention has been described with reference to specific features and embodiments thereof, various modifications and combinations can be made thereto without departing from the invention. The description and drawings are, accordingly, to be regarded simply as an illustration of some embodiments of the invention as defined by the appended claims, and are contemplated to cover any and all modifications, variations, combinations or equivalents that fall within the scope of the present invention. Therefore, although the present invention and its advantages have been described in detail, various changes, substitutions, and alterations can be made herein without departing from the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

Moreover, any module, component, or device exemplified herein that executes instructions may include or otherwise have access to a non-transitory computer/processor-readable storage medium or media for storage of information, such as computer/processor-readable instructions, data structures, program modules, and/or other data. A non-exhaustive list of examples of non-transitory computer/processor-readable storage media includes magnetic cassettes, magnetic tape, magnetic disk storage or other magnetic storage devices, optical disks such as compact disc read-only memory (CD-ROM), digital video discs or digital versatile disc (DVDs), Blu-ray Disc™, or other optical storage, volatile and non-volatile, removable and non-removable media implemented in any method or technology, memory, such as random-access memory (RAM), read-only memory (ROM), electrically erasable programmable read-only memory (EEPROM), flash memory or other memory technology. Any such non-transitory computer/processor storage media may be part of a device or accessible or connectable thereto. Any application or module herein described may be implemented using computer/processor readable/executable instructions that may be stored or otherwise held by such non-transitory computer/processor-readable storage media.

The invention claimed is:

1. A method comprising:
receiving a natural language instruction describing a sequence of actions representative of a manner in which a human would interact with a web browser to perform the actions on web elements of at least one web page, wherein an instruction performance skeleton is based on the natural language instruction;
storing the instruction performance skeleton in a database, wherein the instruction performance skeleton is representative of performance of the actions and includes respective key-value pairs associated with each of the actions; and
concurrently performing a first action of the actions in a first webview of the web browser in parallel with a second action of the actions in a different second webview of the web browser, wherein:
the first webview comprises a first object model of the at least one web page and the second webview comprises a second object model of the at least one web page, and
the first object model comprises a first plurality of the web elements and the second object model comprises a second plurality of the web elements.

2. The method of claim 1, wherein at least one of the first object model and the second object model is a Document Object Model (DOM).

3. The method of claim 2, wherein the DOM has a hierarchical tree structure having branches.

4. The method of claim 3, wherein the DOM has a plurality of labels.

5. The method of claim 4, wherein at least one label is an Accessible Rich Internet Application label.

6. The method of claim 1, wherein the instruction performance skeleton further includes a conditionality, wherein the conditionality is based on the natural language instruction, and wherein the conditionality is based on the performance of the actions.

7. The method of claim 1, wherein the at least one web page comprises at least two web pages.

8. The method of claim 1, wherein at least one web element comprises at least one of a class and a tag.

9. The method of claim 1, wherein at least one webview comprises a mutation observer.

10. The method of claim 1, wherein at least one of the first action and the second action is one of a right click, a left click, and a typing action.

11. A method comprising:
receiving a natural language instruction describing a sequence of actions representative of a manner in which a human would interact with a web browser to perform the actions on web elements of at least one web page, wherein an instruction performance skeleton is based on the natural language instruction;
storing the instruction performance skeleton in a database, wherein the instruction performance skeleton is representative of performance of the actions and includes respective key-value pairs associated with each of the actions;
performing a first action of the actions in a first webview of the web browser, the first webview comprising a first object model of the at least one web page, the first object model comprising a first plurality of the web elements;
receiving an update message related to the performance of the first action, the update message including information about at least one change to the first object model of the at least one web page caused by the performance of the first action; and
based on the at least one change, performing a second action of the actions in a different second webview of the web browser, the second webview comprising a second object model of the at least one web page, the second object model comprising a second plurality of the web elements, and the performance of the second action causing at least one change to the second object model of the at least one web page.

12. The method of claim 11, wherein at least one of the first the object model and the second object model is a Document Object Model (DOM).

13. The method of claim 12, wherein the DOM has a hierarchical tree structure having branches.

14. The method of claim 11, wherein at least one web element comprises at least one of a class and a tag.

15. The method of claim 11, wherein the receiving the update message comprises receiving the update message from a headless browser.

16. The method of claim 11, wherein the receiving the update message comprises receiving the update message from an electronic device hosting the web browser implementing the webview.

17. The method of claim 11, wherein the first action is one of a right click, a left click, and a typing action.

18. The method of claim 11, wherein the second action is one of a right click, a left click, and a typing action.

19. The method of claim 13, wherein the DOM has a plurality of labels.

20. The method of claim 11, wherein at least one webview comprises a mutation observer.

* * * * *